(12) United States Patent
Zhang et al.

(10) Patent No.: US 11,049,002 B2
(45) Date of Patent: **\*Jun. 29, 2021**

(54) NEURAL NETWORK COMPUTATION DEVICE AND METHOD

(71) Applicant: Shanghai Cambricon Information Technology Co., Ltd, Pudong New Area (CN)

(72) Inventors: Lei Zhang, Pudong New Area (CN); Shuai Hu, Pudong New Area (CN); Shaoli Liu, Pudong New Area (CN); Tianshi Chen, Pudong New Area (CN)

(73) Assignee: Shanghai Cambricon Information Technology Co., Ltd, Pudong New Area (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/520,654

(22) Filed: Jul. 24, 2019

(65) Prior Publication Data

US 2019/0347545 A1 Nov. 14, 2019

Related U.S. Application Data

(63) Continuation of application No. 16/283,711, filed on Feb. 22, 2019, now Pat. No. 10,896,369, which is a (Continued)

(30) Foreign Application Priority Data

May 5, 2017 (CN) .......................... 201710312415.6

(51) Int. Cl.
*G06N 3/063* (2006.01)
*G06F 9/30* (2018.01)
*G06F 9/38* (2018.01)

(52) U.S. Cl.
CPC .......... *G06N 3/063* (2013.01); *G06F 9/30029* (2013.01); *G06F 9/30025* (2013.01); *G06F 9/30083* (2013.01); *G06F 9/3802* (2013.01)

(58) Field of Classification Search
CPC ..................................................... G06N 3/063
(Continued)

(56) References Cited

U.S. PATENT DOCUMENTS 5,629,884 A * 5/1997 Pan .......................... G06F 1/035
341/75
5,931,945 A 8/1999 Yung et al.
(Continued)

FOREIGN PATENT DOCUMENTS

CN 100586092 C 1/2010
CN 201726420 U 1/2011
(Continued)

OTHER PUBLICATIONS

Miyashita et al. "Convolutional Neural Networks using Logarithmic Data Representation" Mar. 17, 2016, eprint at arXiv.org, <arXiv.org/abs/1603.01025> (Year: 2016).*
(Continued)

*Primary Examiner* — James D. Rutten
(74) *Attorney, Agent, or Firm* — Getech Law LLC; Jun Ye

(57) ABSTRACT

The present disclosure provides a computation device including: a computation module for executing a neural network computation, and a power conversion module connected to the computation module, for converting input data and/or output data of the neural network computation into power data. The present disclosure further provides a computation method. The computation device and method of the
(Continued)

present disclosure may reduce the cost of storage resources and computing resources, and may increase the computation speed.

28 Claims, 12 Drawing Sheets

Related U.S. Application Data continuation-in-part of application No. PCT/CN2018/081929, filed on Apr. 4, 2018.

(58) Field of Classification Search
USPC .......................................................... 706/43
See application file for complete search history.

(56) References Cited

U.S. PATENT DOCUMENTS

| | | | |
|---|---|---|---|
| 6,038,580 | A | 3/2000 | Yeh |
| 6,330,657 | B1 | 12/2001 | Col et al. |
| 9,435,315 | B2 | 9/2016 | Kalnay |
| 2002/0027552 | A1 | 3/2002 | Lee |
| 2003/0088600 | A1 | 5/2003 | Lao et al. |
| 2004/0236920 | A1 | 11/2004 | Sheaffer et al. |
| 2010/0075645 | A1 | 3/2010 | Yamamura et al. |
| 2014/0081893 | A1 | 3/2014 | Modha |
| 2014/0208069 | A1* | 7/2014 | Wegener ............ G06F 9/30032 712/22 |
| 2014/0278126 | A1 | 9/2014 | Adelman et al. |
| 2015/0170021 | A1* | 6/2015 | Lupon .................... G06N 3/063 706/15 |
| 2015/0356054 | A1 | 12/2015 | Barak et al. |
| 2017/0315778 | A1* | 11/2017 | Sano .................. G06F 9/30025 |
| 2018/0089562 | A1* | 3/2018 | Jin ........................ G06F 7/5443 |
| 2018/0307950 | A1* | 10/2018 | Nealis ..................... G06K 9/66 |

FOREIGN PATENT DOCUMENTS

| | | |
|---|---|---|
| CN | 102508803 A | 6/2012 |
| CN | 102930336 A | 2/2013 |
| CN | 104750758 A | 7/2015 |
| CN | 104836822 A | 8/2015 |
| CN | 105426160 A | 3/2016 |
| CN | 106066783 A | 11/2016 |
| CN | 106155946 A | 11/2016 |
| CN | 106371972 A | 2/2017 |
| EP | 3624018 A1 | 4/2018 |
| EP | 3633526 A1 | 4/2018 |
| WO | 2016099779 A1 | 6/2016 |

OTHER PUBLICATIONS

Chen et al. "DianNao: A Small-Footprint High-Throughput Accelerator for Ubiquitous Machine-Learning", ASPLOS 14, Proceedings of the 19th International Conference on Architectural Support for Programming Languages and Operating Systems, Mar. 1-5, 2014, pp. 269-283 (Year: 2014).*
X. Chen, J. Jiang, J. Zhu and C. Tsui, "A high-throughput and energy-efficient RRAM-based convolutional neural network using data encoding and dynamic quantization," 2018 23rd Asia and South Pacific Design Automation Conference (ASP-DAC), 2018, pp. 123-128, doi: 10.1109/ASPDAC.2018.8297293. (Year: 2018).*
PCT/CN2018081929, Search Report, dated May 30, 2018, 10 pages. (No English Translation).
Lazzizzera, et al.,Fast and Compact Controllers with Digital Neural Networks, Instrumentation and Measurement Technology Conference, 1997, pp. 226-231, IEEE.
CN201710312415.6, Office Action, dated May 8, 2020, 10 pages. (No English Translation).
EP19199524.0, Reply to Search Opinion/Written Opinion/IPER filed Sep. 9, 2020, 61 pages.
EP19199524.0, Communication Pursuant to Article 94(3) dated Dec. 21, 2020, 9 pages.
Donovan, et al., "Pixel Processing in a Memory Controller", 8222 IEEE Computer Graphics and Applications, Jan. 15, 1995, No. 1, 11 pages.
19 199 526.5-1231, Communication Pursuant to Article 94(3) dated Jan. 14, 2021, 10 pages.
Zekri, Restructuring and Implementations of 2D Matrix Transpose Algorithm Using SSE4 Vector Instructions, 2015, IEEE, 7 pages.
Shahbahrami, et al., Matrix Register File and Extended Subwords: Two Techniques for Embedded Media Processors, 2005, ACM, 9 pages.
EP19199526.5, Reply to Search Opinion/Written Opinion/IPER filed Oct. 2, 2020, 45 pages.
19199526.5-1231, Extended European Search Report, dated Mar. 5, 2020, 10 pages.
19 199 528.1-1203, Communication Pursuant to Article 94(3) dated Nov. 13, 2020, 8 pages.
18 780 474.5-1203, Communication Pursuant to Article 94(3) dated Nov. 25, 2020, 7 pages.
18 780 474.5-1203, Reply to Examination Report filed Oct. 12, 2020, 167 pages.

* cited by examiner

| Power-bit data | 00000 | 00001 | 00010 | 00011 | 00100 |
|---|---|---|---|---|---|
| Exponential value | 0 | 3 | 4 | 1 | Zero setting |

| Power-bit data | 00000 | 00001 | 00010 | 00011 | 11111 |
|---|---|---|---|---|---|
| Exponential value | 0 | 1 | 2 | 3 | Zero setting |

| Power-bit data | 00000 | 00001 | 00010 | 00011 | 11111 |
|---|---|---|---|---|---|
| Exponential value | 0 | 2 | 4 | 6 | Zero setting |

| Power-bit data | 11111 | 11110 | 11101 | 11100 | 00000 |
|---|---|---|---|---|---|
| Exponential value | 0 | 1 | 2 | 3 | Zero setting |

NEURAL NETWORK COMPUTATION DEVICE AND METHOD

TECHNICAL FIELD

The present disclosure relates to the technical field of artificial intelligence, and more particularly to a neural network computation device and method that support power neuron representations.

BACKGROUND

Multi-layer neural networks are widely used in tasks such as classification and recognition. In recent years, due to their high identification rate and high parallelism, they have received extensive attention from academia and industry.

At present, some neural networks with better performance are usually very large, which means that these neural networks require numerous computing resources and storage resources. The overhead of numerous computing resources and storage resources would reduce the computational speed of the neural networks, and at the same time, impose more strict requirements on the transmission bandwidth of hardware and on the computation device.

SUMMARY

(I) Technical Problem to be Solved

The present disclosure provides a computation device and method, which at least partially solve the technical problem as mentioned above.

(II) Technical Solutions

An aspect of the present disclosure provides a neural network computation device including:

a computation module for executing a neural network computation; and a power conversion module connected to the computation module for converting input data and/or output data of the neural network computation into power data.

In some embodiments, the input data may include input neuron data and input weight data; the output data may include output neuron data and output weight data; and the power data may include power neuron data and power weight data.

In some embodiments, the power conversion module may include:

a first power conversion unit for converting the output data of the computation module into power data; and a second power conversion unit for converting the input data of the computation module into power data.

In some embodiments, the computation module may further include a third power conversion unit for converting power data into non-power data.

In some embodiments, the neural network computation device may further include: a storage module for storing data and computational instructions;

a control module for controlling interactions of the data and the computational instructions, the control module may be configured to receive the data and the computational instructions sent by the storage module and decode the computational instructions into computational microinstructions;

the computation module may include a computation unit for receiving the data and the computational microinstructions sent by the control module, and performing the neural network computation on the received weight data and neuron data according to the computational microinstructions.

In some embodiments, the control module may include an instruction buffer unit, a decoding unit, an input neuron buffer unit, a weight buffer unit, and a data control unit, the instruction buffer unit may be connected to the data control unit for receiving computational instructions sent by the data control unit;

the decoding unit may be connected to the instruction buffer unit for reading computational instructions from the instruction buffer unit and decoding the computational instructions into computational microinstructions;

the input neuron buffer unit may be connected to the data control unit for acquiring corresponding power neuron data from the data control unit;

the weight buffer unit may be connected to the data control unit for acquiring corresponding power weight data from the data control unit;

the data control unit may be connected to the storage module for implementing interactions of the data and the computational instructions between the storage module and the computational instruction buffer unit, the weight buffer unit as well as the input neuron buffer unit, respectively;

the computation unit may be connected to the decoding unit, the input neuron buffer unit, and the weight buffer unit respectively, for receiving the computational microinstructions, the power neuron data, and the power weight data, and performing corresponding neural network computations on the power neuron data and the power weight data received by the computation unit according to the computational microinstructions.

In some embodiments, the neural network computation device may further include an output module. The output module may include an output neuron buffer unit for receiving neuron data output from the computation module;

the power conversion module may include:

a first power conversion unit connected to the output neuron buffer unit and the computation unit for converting the neuron data output from the output neuron buffer unit into the power neuron data and converting the weight data output from the computation unit into the power weight data; and a second power conversion unit connected to the storage module for converting the neuron data and the weight data input to the storage module into the power neuron data and the power weight data, respectively;

the computation module may further include a third power conversion unit connected to the computation unit for converting the power neuron data and the power weight data into non-power neuron data and non-power weight data, respectively.

In some embodiments, the first power conversion unit may be further connected to the data control unit for converting the neuron data and the weight data output from the computation module into the power neuron data and the power weight data respectively, and sending the power neuron data and the power weight data to the data control unit as input data of a next layer of neural network computation.

In some embodiments, the power neuron data may include a sign bit used to indicate a sign of the power neuron data and a power bit used to indicate power-bit data of the power neuron data; the sign bit may include one or more bits of data, and the power bit may include m bits of data, in which m is a positive integer greater than 1;

the power weight data indicates that a value of the weight data is represented in the manner of its power exponent, where the power weight data may include a sign bit and a power bit, the sign bit may use one or more bits to represent the sign of the weight data, and the power bit may use m bits to represent the power-bit data of the weight data, in which m is a positive integer greater than 1.

In some embodiments, the neural network computation device may further include a storage module with an prestored encoding table, the encoding table may include the power-bit data and exponential values, and the encoding table may be used for acquiring a corresponding exponential value of each power-bit data according to the power-bit data of the power neuron data and the power weight data.

In some embodiments, the encoding table may further include one or more zero setting power-bit data, corresponding power neuron data and power weight data of the zero setting power-bit data are 0.

In some embodiments, the power neuron data and the power weight data corresponding to maximum power-bit data are 0, or the power neuron data and the power weight data corresponding to minimum power-bit data are 0.

In some embodiments, a correspondence in the encoding table may be that a most significant bit of the power-bit data represents a zero setting bit, while the other m−1 bits of the power-bit data correspond to the exponential values.

In some embodiments, a correspondence in the encoding table may be a positive correlation. An integer x and a positive integer y may be pre-stored in the storage module, where the exponential value corresponding to minimum power-bit data is x, where x denotes an offset value and y denotes a step length.

In some embodiments, the exponential value corresponding to minimum power-bit data is x, the power neuron data and the power weight data corresponding to maximum power-bit data are 0, and the exponential values corresponding to other power-bit data than the minimum and the maximum power-bit data are (power-bit data+x)*y.

In some embodiments, y=1, x=−2$^{m-1}$.

In some embodiments, a correspondence in the encoding table may be a negative correlation. An integer x and a positive integer y are pre-stored in a storage module, where the exponential value corresponding to the maximum power-bit data is x, where x denotes an offset value and y denotes a step length.

In some embodiments, the exponential value corresponding to maximum power-bit data is x, the power neuron data and the power weight data corresponding to minimum power-bit data are 0, and the exponential values corresponding to other power-bit data than the minimum and maximum power-bit data are (power-bit data−x)*y.

In some embodiments, y=1, x=2$^{m-1}$.

In some embodiments, converting the neuron data and the weight data respectively into the power neuron data and the power weight data may include:

$$s_{out}=s_{in}$$

$$d_{out+}=\lfloor \log_2(d_{in+}) \rfloor$$

where $d_{in}$ is the input data of the power conversion unit, $d_{out}$ is the output data of the power conversion unit, $s_{in}$ is the sign of the input data, $s_{out}$ is the sign of the output data, $d_{in+}$ is a positive part of the input data with $d_{in+}=d_{in}\times s_{in}$, $d_{out+}$ is a positive part of the output data with $d_{out+}=d_{out}\times s_{out}$, $\lfloor x \rfloor$ represents a flooring operation on the data x; or $$s_{out}=s_{in}$$

$$d_{out+}=\lceil \log_2(d_{in+}) \rceil$$

where $d_{in}$ is the input data of the power conversion unit, $d_{out}$ is the output data of the power conversion unit, $s_{in}$ is the sign of the input data, $s_{out}$ is the sign of the output data, $d_{in+}$ is a positive part of the input data with $d_{in+}=d_{in}\times s_{in}$, $d_{out+}$ is a positive part of the output data with $d_{out+}=d_{out}\times s_{out}$, $\lceil x \rceil$ represents a ceiling operation on the data x; or $$s_{out}=s_{in}$$

$$d_{out+}=[\log_2(d_{in+})]$$

where $d_{in}$ is the input data of the power conversion unit, $d_{out}$ is the output data of the power conversion unit, $s_{in}$ is the sign of the input data, $s_{out}$ is the sign of the output data, $d_{in+}$ is a positive part of the input data with $d_{in+}=d_{in}\times s_{in}$, $d_{out+}$ is a positive part of the output data with $d_{out+}=d_{out}\times s_{out}$, [x] represents a rounding operation on the data x.

The other aspect of the present disclosure, provides a neural network computation method including:

executing a neural network computation; and converting input data of the neural network computation into power data prior to the execution of the neural network computation; and/or converting output data of the neural network computation into power data after the execution of the neural network computation.

In some embodiments, the input data may include input neuron data and input weight data, the output data may include output neuron data and output weight data, and the power data may include power neuron data and power weight data.

In some embodiments, the converting input data of the neural network computation into power data prior to the execution of the neural network computation may include:

converting non-power data in the input data into power data; and receiving and storing computational instructions and the power data.

In some embodiments, between the receiving and storing computational instructions and the power data, and the executing the neural network computation, the method may further include:

reading computational instructions, and decoding the computational instructions into respective computational microinstructions.

In some embodiments, in the executing the neural network computation, the power weight data and the power neuron data may be subjected to the neural network computation according to the computational microinstructions.

In some embodiments, the converting output data of the neural network computation into power data after the execution of the neural network computation may include:

outputting data obtained from the neural network computation; and converting non-power data in the data obtained from the neural network computation into power data.

In some embodiments, the non-power data in the data obtained from the neural network computation may be converted into power data which then may be sent to the data control unit, as input data of a next layer of the neural network computation; the neural network computation and the converting the non-power data into the power data may be repeated until the computation of a last layer of the neural network is finished.

In some embodiments, an integer x and a positive integer y may be pre-stored in the storage module, where x denotes an offset value and y denotes a step length; a range of the power data representable by the neural network computation device can be adjusted by changing the integer x and the positive integer y pre-stored in the storage module.

Another aspect of the present disclosure provides a method of using the neural network computation device, where a range of the power data representable by the neural network computation device can be adjusted by changing the integer x and the positive integer y pre-stored in the storage module.

(III) Technical Effects

It can be learnt from the above technical solutions that the computation device and method according to the present disclosure have at least one of the following technical effects:

(1) By storing neuron data and weight data in the manner of power data representations, the storage space required for storing network data may be reduced, and at the same time, such data representation may simplify multiplication of neurons and weight data, relax the design requirements for the operator, and increase the computation speed of the neural network.

(2) By converting neuron data obtained after the computation into power neuron data, the overhead on neural network storage resources and computing resources may be reduced, which may help to increase the computation speed of the neural network.

(3) Before being input to the neural network computation device, the non-power neuron data may first be subjected to a power conversion, and then input to the neural network computation device, which may further reduce the overhead on neural network storage resources and computing resources and may increase the computation speed of the neural network.

BRIEF DESCRIPTION OF THE DRAWINGS

The drawings are intended to facilitate further understanding of the present disclosure and constitute a part of the specification, and, together with the embodiments below, serve to explain the present disclosure, rather than limit the present disclosure. In the drawings.

DETAILED DESCRIPTION

Figure 1A:
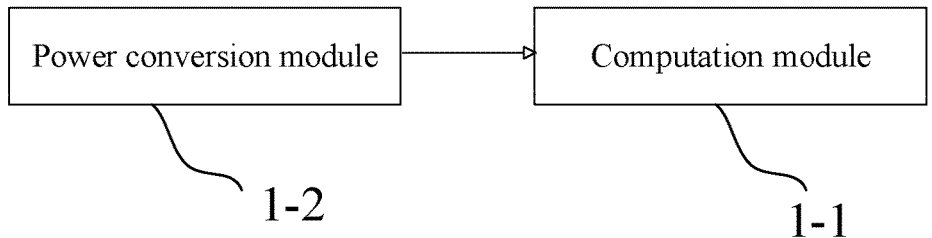
FIG. 1A is a structural diagram for a neural network computation device according to an embodiment of the present disclosure.

To facilitate the understanding of the object, technical solutions, and advantages of the present disclosure, the present disclosure will be further described in detail below with reference to the specific embodiments and drawings.

It should be noted that in the drawings or the description of the specification, the similar reference numbers are used for similar or identical parts. Implementing modes not shown or described in the drawings are known to those of ordinary skill in the art. Additionally, although examples including parameters of specific values may be provided herein, it should be understood that the parameters are not necessarily exactly equal to the corresponding values, but may approximate the corresponding values within acceptable tolerances or design constraints. The directional terms mentioned in the embodiments, such as "upper", "lower", "front", "back", "left", "right", etc., only refer to the directions in the drawings. Therefore, the directional terms here are used to describe, rather than limit, the scope of protection of the present disclosure.

In one embodiment of the present disclosure, as shown in FIG. 1A, a computation device may include: a computation module 1-1 for executing a neural network computation; and a power conversion module 1-2 connected to the computation module, for converting input neuron data and/or output neuron data of the neural network computation into power neuron data.

Figure 1B:
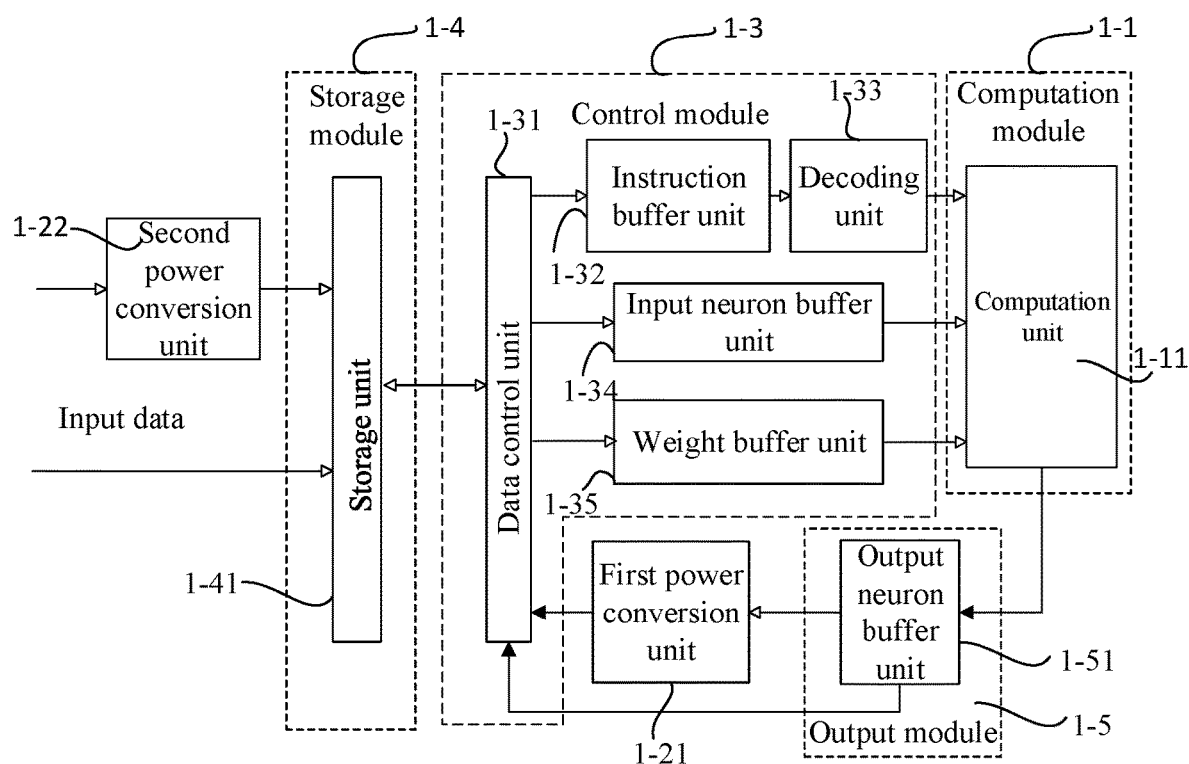
FIG. 1B is a structural diagram for a neural network computation device according to another embodiment of the present disclosure.

In the other embodiment, as shown in FIG. 1B, a computation device may include:

a storage module 1-4 for storing data and computational instructions;

a control module 1-3 connected to the storage module for controlling interactions of the data and the computational instructions, the control module 1-3 may be configured to receive the data and the computational instructions sent by the storage module and decode the computational instructions into computational microinstructions;

the computation module 1-1 connected to the control module for receiving the data and the computational microinstructions sent by the control module, and performing the neural network computation on the received weight data and neuron data according to the computational microinstructions; and the power conversion module 1-2 connected to the computation module, for converting input neuron data and/or output neuron data of the neural network computation into power neuron data.

Those skilled in the art can understand that the storage module may be integrated in the computation device, or it may be disposed outside the computation device as an off-chip memory.

To be specific, further referring to FIG. 1B, the storage module may include: a storage unit 1-41 for storing data and computational instructions.

The control module may include:

An instruction buffer unit 1-32 connected to the data control unit for receiving computational instructions sent by the data control unit;

a decoding unit 1-33 connected to the instruction buffer unit for reading computational instructions from the instruction buffer unit and decoding the computational instructions into computational microinstructions;

an input neuron buffer unit 1-34 connected to the data control unit for receiving neuron data sent by the data control unit;

a weight buffer unit 1-35 connected to the data control unit, for receiving weight data sent from the data control unit;

a data control unit 1-31 connected to the storage module for implementing interactions of the data and the computational instructions between the storage module and the computational instruction buffer unit, the weight buffer unit as well as the input neuron buffer unit, respectively.

The computation module may include: a computation unit 1-11 connected to the decoding unit, the input neuron buffer unit and the weight buffer unit respectively, for receiving the computational microinstructions, the neuron data and the weight data, and performing corresponding computations on the received neuron data and weight data according to the computational microinstructions.

In an optional embodiment, the computation unit may include, but is not limited to: a first or more multipliers as a first part; one or more adders as a second part (more specifically, an adder tree formed by the adders of the second part), an activation function unit as a third part, and/or a vector processing unit as a fourth part. More specifically, the vector processing unit can process vector computations and/or pooling computations. The first part may multiply input data 1 (in1) with input data 2 (in2) to obtain output (out) after multiplication, with the process: out=in1*in2; the second part may add the input data (in1) by the adders to obtain the output data (out). More specifically, when the second part is an adder tree, the input data (in1) may be added step by step through the adder tree to obtain the output data (out); where in1 is a vector having a length of N, N>1, with the process: out=in1[1]+in1[2]+ . . . +in1[N]; and/or the input data (in1) may be accumulated by the adder tree and then added with the input data (in2) to get the output data (out), with the process: out=in1[1]+in1[2]+ . . . +in1[N]+in2; or the input data (in1) may be added with the input data (in2) to obtain the output data (out), with the process: out=in1+in2. The third part may operate on the input data (in) with the activation function (active) to obtain the activation output data (out), with the process: out=active(in); where the activation function (active) can be sigmoid, tanh, relu, softmax, and the like. In addition to the activation operation, the third part can implement other nonlinear functions. The output data (out) can be obtained by subjecting the input data (in) to a computation (f), with the process: out=f(in). The vector processing unit may perform a pooling computation on the input data (in) to obtain an output data (out) after a pooling operation, with the process: out=pool(in), where the "pool" refers to a pooling operation. The pooling operation may include, but is not limited to: average pooling, maximum pooling, and median pooling; and the input data (in) may be data in a pooling kernel associated with the output (out).

The execution of computation by the computation unit may include: a first part of multiplying the input data 1 with the input data 2 to obtain the multiplied data; and/or a second part of performing addition (more specifically, the adder tree computations configured to add the input data 1 step by step through the adder tree), or adding the input data 1 with the input data 2 to obtain output data; and/or a third part of performing an activation function computation by applying an activation function (active) computation on the input data to obtain the output data; and/or a fourth part of performing a pooling computation with the process: out=pool (in), where "pool" refers to a pooling operation. The pooling operation may include, but is not limited to: average pooling, maximum pooling, and median pooling; and the input data (in) is data in a pooling kernel associated with the output (out). In the computations of the above parts, one or more parts can be selected freely to make combinations in different orders, so that computations of different functions may be realized. Accordingly, computing units may constitute an architecture of two, three, or four flow-levels.

In another optional embodiment, the computation unit may include a main processing circuit and a plurality of secondary processing circuits.

The main processing circuit may be configured to partition one input data into a plurality of data partitions and sends at least one of the plurality of data partitions and at least one of a plurality of computational instructions to the secondary processing circuits;

the plurality of secondary processing circuits may be configured to execute computations on the received data partitions according to the computation instructions to obtain intermediate results, and to transmit the intermediate results to the main processing circuit;

the main processing circuit may be configured to process the intermediate results sent from the plurality of secondary processing circuits to obtain results of the computational instructions, and send the results of the computational instructions to the data control unit.

Figure 1C:
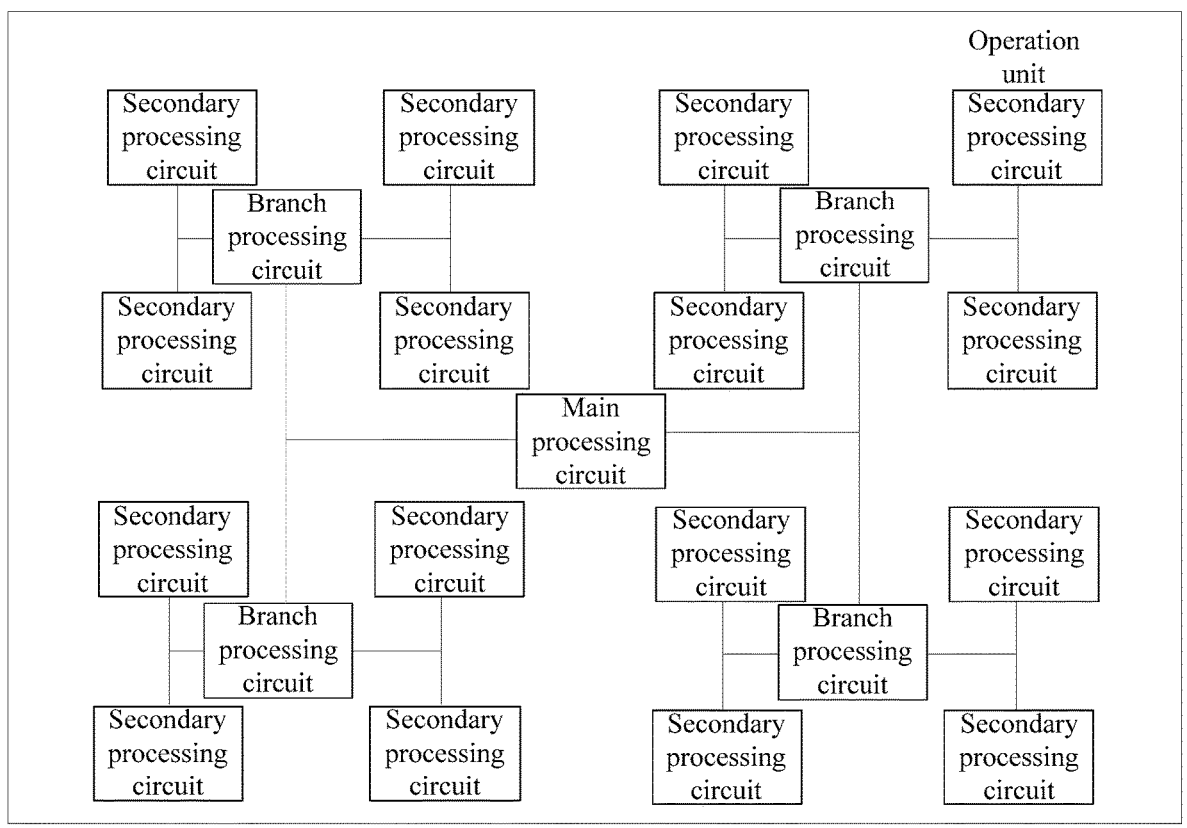
FIG. 1C is a functional diagram for a computation unit according to an embodiment of the present disclosure.

In an optional embodiment, a computation unit as shown in FIG. 1C may include branch processing circuits, where the main processing circuit may be connected to the branch processing circuits, while the branch processing circuits may be connected to the plurality of secondary processing circuits;

the branch processing circuits may be configured to transmit data or instructions between the main processing circuit and the secondary processing circuits.

Figure 1D:
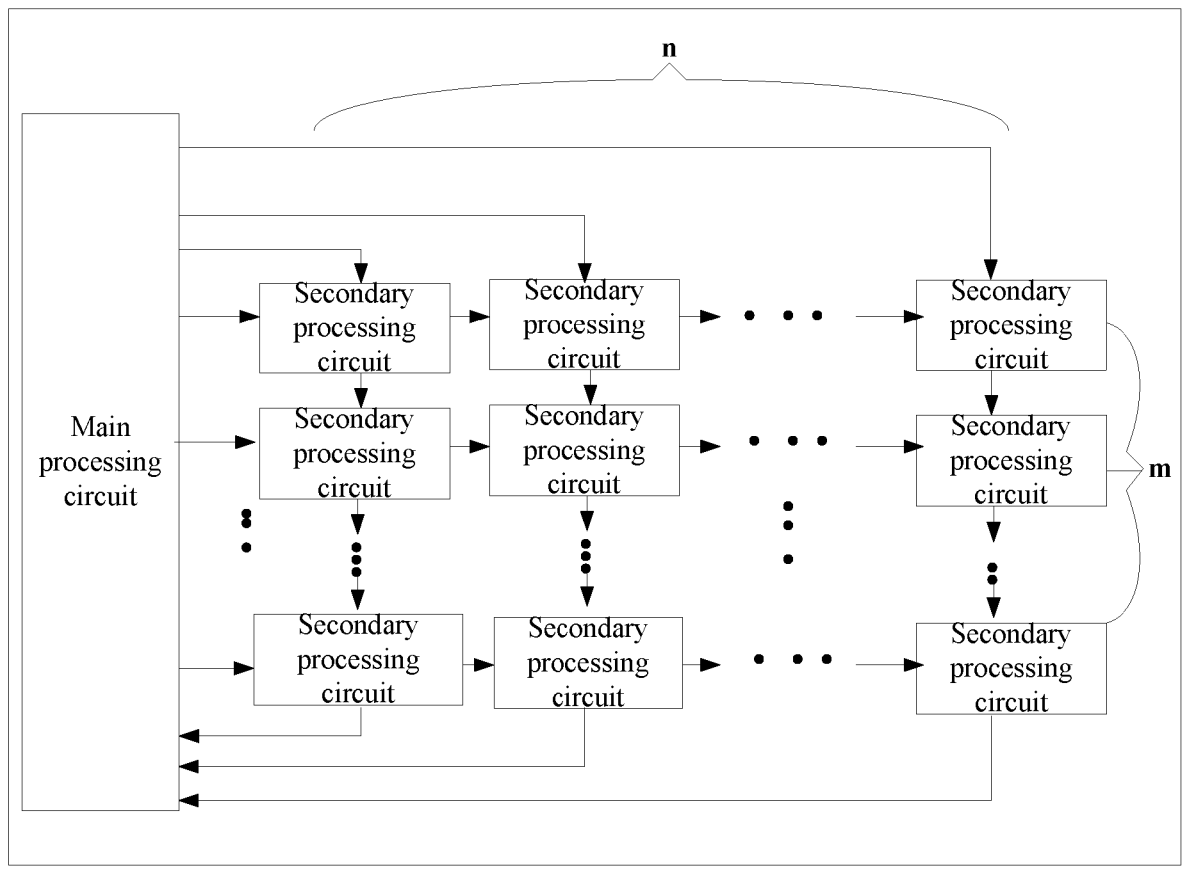
FIG. 1D is another functional diagram for a computation unit according to an embodiment of the present disclosure.

In another optional embodiment, a computation unit as shown in FIG. 1D may include a main processing circuit and a plurality of secondary processing circuits. Alternatively, the plurality of secondary processing circuits may be distributed in the form of an array; each secondary processing circuits may be connected to other adjacent secondary processing circuits, and the main processing circuit may be connected to k secondary processing circuits of the plurality of secondary processing circuits, where the k fundamental circuits may include: n secondary processing circuits in a first line, n secondary processing circuits in a m-th line and m secondary processing circuits in a first row.

The k secondary processing circuits may be configured to transmit data and instructions between the main processing circuit and the plurality of secondary processing circuits.

Figure 1E:
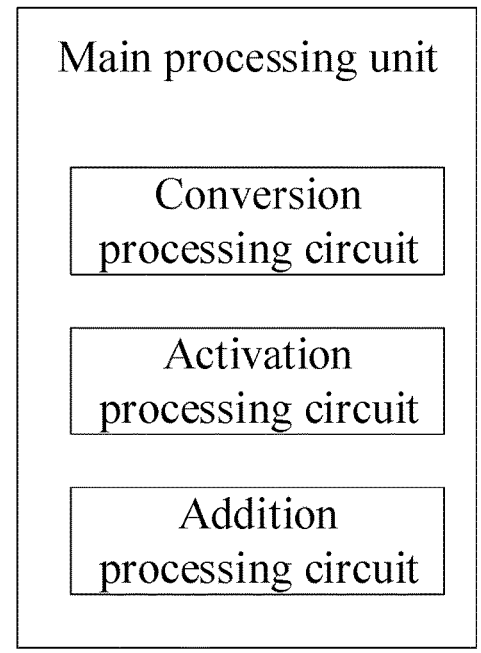
FIG. 1E is a functional diagram for a main processing circuit according to an embodiment of the present disclosure.

Alternatively, as shown in FIG. 1E, the main processing circuit may further include one or any combination of the following: a conversion processing circuit, an activation processing circuit, and an addition processing circuit;

the conversion processing circuit may be configured for interconversion of a first data structure and a second data structure (e.g. conversion between continuous data and discrete data) on the data partitions or the intermediate results received by the main processing circuit; or for interconversion of a first data type and a second data type (e.g. conversion between a fixed point type and a floating point type) on the data partitions or the intermediate results received by the main processing circuit;

the activation processing circuit may be configured to execute an activation computation on the data in the main processing circuit;

the addition processing circuit may be configured to execute an addition or accumulation computation.

The secondary processing circuits may include:

a multiplication processing circuit for executing multiplication on the received data partitions to obtain a product result;

a forwarding processing circuit (optional) for forwarding the received data partitions or the product result;

an accumulation processing circuit for executing accumulation on the product results to obtain the intermediate results.

In yet another optional embodiment, the computational instructions may be computation matrix-matrix multiplication instructions, accumulation instructions, activation instructions, and the like.

The output module 1-5 may include: an output neuron buffer unit 1-51 connected to the computation unit for receiving neuron data output by the computation unit;

the power conversion module may include:

a first power conversion unit 1-21 connected to the output neuron buffer unit, for converting the neuron data output by the output neuron buffer unit into power neuron data; and a second power conversion unit 1-22 connected to the storage module, for converting the neuron data input to the storage module into power neuron data; and directly storing the power neuron data in the neural network input data into the storage module.

If the neural network computation device utilizes an I/O module for data input/output, the first and second power conversion units can also be disposed between the I/O module and the computation module so as to convert the input neuron data and/or the output neuron data of the neural network computation into power neuron data.

Figure 1F:
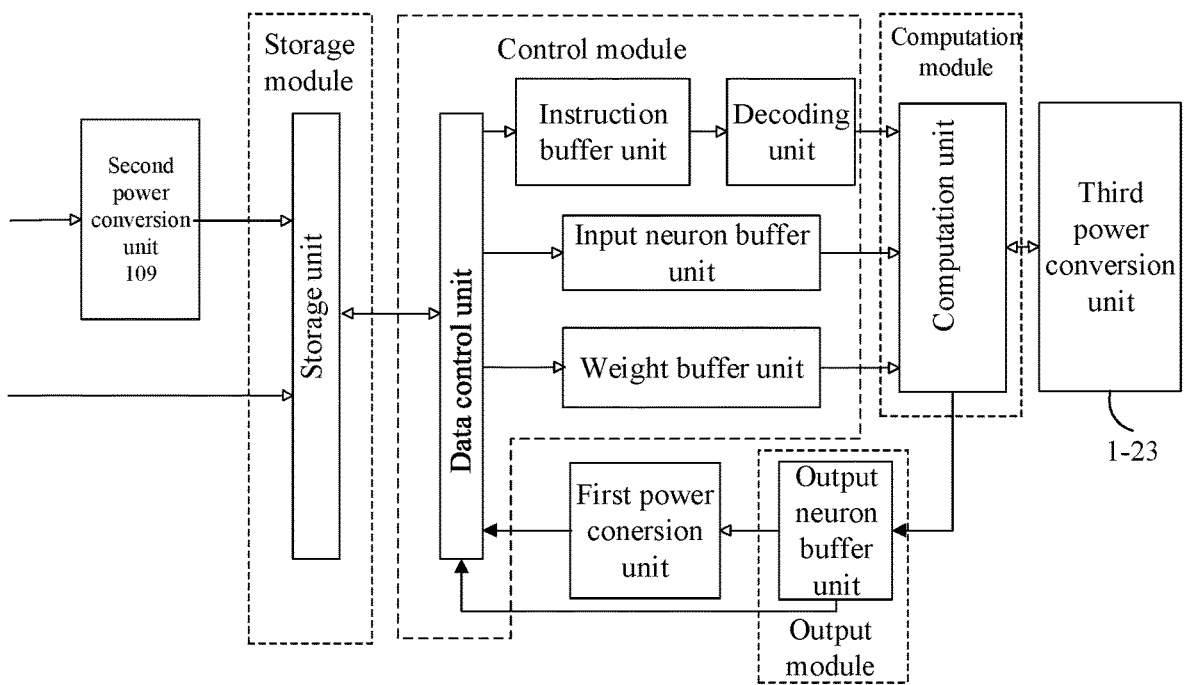
FIG. 1F is another structural diagram for a neural network computation device according to an embodiment of the present disclosure.
Figure 1G:
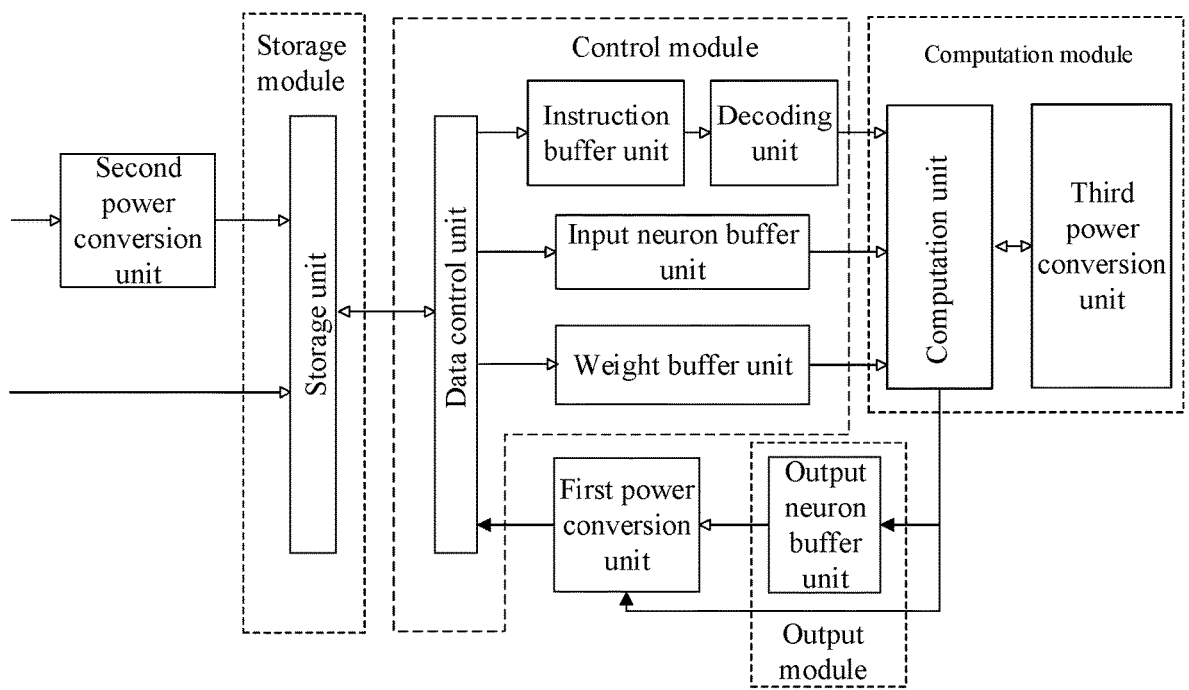
FIG. 1G is still another structural diagram for a neural network computation device according to an embodiment of the present disclosure.

Optionally, the computation module may include: a third power conversion unit 1-23 for converting the power neuron data into non-power neuron data. The non-power neuron data is converted into the power neuron data by the second power conversion unit and then is input to the computation unit for computation. During the computation, to increase precision, the third power conversion unit may be optionally disposed for converting the power neuron data into the non-power neuron data. The third power conversion unit may be disposed either outside the computation module (as shown in FIG. 1F) or inside the computation module (as shown in FIG. 1G). The output non-power neuron data after the computation may be converted into the power neuron data by the first power conversion unit and then be fed back to the data control unit for subsequent computations so as to increase the computation speed. A closed cycle may then be formed.

Certainly, the data output by the computation module may also be directly sent to the output neuron buffer unit, and then to the data control unit by the output neuron buffer unit, without passing through the power conversion units.

Hereinto, the storage module can receive data and computational instructions from the external address spaces, and the data may include neural network weight data, neural network input data, and the like.

In addition, there are several options for power conversions. The following lists three manners of power conversion used in the embodiment:

A first power conversion manner:

$$s_{out}=s_{in}$$

$$d_{out+}=\lfloor \log_2(d_{in+}) \rfloor$$

where $d_{in}$ is the input data of the power conversion unit, $d_{out}$ is the output data of the power conversion unit, $s_{in}$ is the sign of the input data, $s_{out}$ is the sign of the output data, $d_{in+}$ is a positive part of the input data with $d_{in+}=d_{in} \times s_{in}$, $d_{out+}$ is a positive part of the output data with $d_{out+}=d_{out} \times s_{out}$, $\lfloor x \rfloor$ represents a flooring operation on the data x.

A second power conversion manner:

$$s_{out}=s_{in}$$

$$d_{out+}=\lceil \log_2(d_{in+}) \rceil$$

where $d_{in}$ is the input data of the power conversion unit, $d_{out}$ is the output data of the power conversion unit, $s_{in}$ is the sign of the input data, $s_{out}$ is the sign of the output data, $d_{in+}$ is a positive part of the input data with $d_{in+}=d_{in} \times s_{in}$, $d_{out+}$ is a positive part of the output data with $d_{out+}=d_{out} \times s_{out}$, $\lceil x \rceil$ represents a ceiling operation on the data x.

A third power conversion manner:

$$s_{out}=s_{in}$$

$$d_{out+}=[\log_2(d_{in+})]$$

where $d_{in}$ is the input data of the power conversion unit, $d_{out}$ is the output data of the power conversion unit, $s_{in}$ is the sign of the input data, $s_{out}$ is the sign of the output data, $d_{in+}$ is a positive part of the input data with $d_{in+}=d_{in} \times s_{in}$, $d_{out+}$ is a positive part of the output data with $d_{out+}=d_{out} \times s_{out}$, $[x]$ represents a rounding operation on the data x.

It should be noted that, in addition to rounding, ceiling and flooring, the manners for power conversion of the present disclosure may also be fractional-event, fractional-odd, rounding towards zero, and random rounding. Among them, rounding, rounding towards zero and random rounding are preferred to reduce the loss of precision.

In addition, an embodiment of the present disclosure further provides a neural network computation method, including: executing a neural network computation; and converting input neuron data of the neural network computation into power neuron data prior to the execution of the neural network computation; and/or converting output neuron data of the neural network computation into power neuron data after the execution of the neural network computation Optionally, the converting input neuron data of the neural network computation into power neuron data prior to the execution of the neural network computation may include: converting non-power neuron data in the input data into the power neuron data; and receiving and storing computational instructions, the power neuron data, and weight data.

Optionally, between the receiving and storing computational instructions, the power neuron data and weight data, and the executing the neural network computation, the method further includes reading the computational instructions, and decoding them into respective computational microinstructions.

Optionally, in the executing the neural network computation, the weight data and the power neuron data are subjected to the neural network computation according to the computational microinstructions.

Optionally, the step of converting output neuron data of the neural network computation into power neuron data after the execution of the neural network computation may include: outputting neuron data obtained from the neural network computation; and converting non-power neuron data in the neuron data obtained from the neural network computation into the power neuron data.

Optionally, the non-power neuron data in the neuron data obtained from the neural network computation may be converted into power neuron data which then may be sent to the data control unit as input power neurons of the next layer of the neural network computation; the neural network computation and the converting the non-power neuron data into the power neuron data may be repeated until the computation of a last layer of the neural network is finished.

Figures 1H, 1I, 1J:
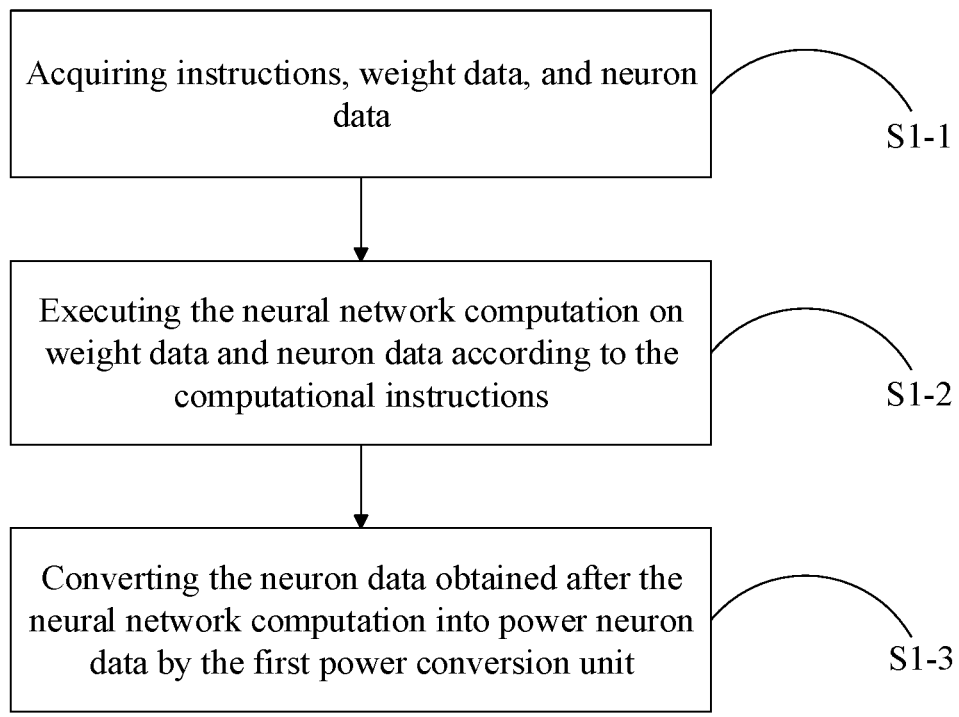
FIG. 1H is a flow chart of a neural network computation method according to an embodiment of the present disclosure.
FIG. 1I is a diagram for an encoding table according to an embodiment of the present disclosure.
FIG. 1J is another diagram for an encoding table according to an embodiment of the present disclosure.

To be specific, the neural network according an embodiment of the present disclosure may be a multi-layer neural network. In some embodiments, for each layer of the neural network, computation can be performed according to the computation method as shown in FIG. 1H, where the input power neuron data for a first layer of the neural network can be read from an external address via the storage module; if the data read from the external address is power data already, the data may be directly transmitted into the storage module; if the data is not power data, the data has to be converted into power data by the power conversion unit and then the input power neuron data of each layer of the neural network can be provided by the output power neuron data of one or more layers of the neural networks prior to this layer. A monolayer neural network computation method according to an embodiment is shown in FIG. 1H including:

Step S1-1: acquiring computational instructions, weight data, and neuron data.

The Step S1-1 may include the following sub-steps:

S1-11: inputting the computational instructions, the neuron data, and the weight data to the storage module, where the power neuron data may be directly input to the storage module, and the non-power neuron data may be converted by the second power conversion unit and then input to the storage module;

S1-12: receiving, by the data control unit, the computational instructions, the power neuron data, and the weight data sent by the storage module;

S1-13: receiving, by a computational instruction buffer unit, an input neuron buffer unit, and a weight buffer unit respectively, the computational instructions, the power neuron data, and the weight data sent by the data control unit and distributing them to the decoding unit or the computation unit.

The power neuron data indicates that values of neuron data are represented by power exponential values of the values of neuron data. Specifically, the power neuron data may include a sign bit and a power bit; the sign bit represents a sign of the power neuron data with one or more bits, and the power bit represents power-bit data of the power neuron data with m bits, m being a positive integer greater than 1. An encoding table may be pre-stored in the storage unit of the storage module to provide an exponential value corresponding to each power-bit data of the power neuron data. The encoding table may provide one or more power-bit data (i.e., zero setting power-bit data) to make an assigned corresponding power neuron data 0. In other words, when the power-bit data of the power neuron data is a zero setting power-bit data in the encoding table, the power neuron data is 0; where, the encoding table may be flexibly stored in the form of a table or a mapping by a function relationship.

A correspondence in the encoding table may be arbitrary.

For example, a correspondence in the encoding table may be scrambled. A part of an encoding table with m being 5 is shown in FIG. 1I, when the power-bit data is 00000, the corresponding exponential value is 0; when the power-bit data is 00001, the corresponding exponential value is 3; when the power-bit data is 00010, the corresponding exponential value is 4; when the power-bit data is 00011, the corresponding exponential value is 1; and when the power-bit data is 00100, the corresponding power neuron data is 0.

A correspondence in the encoding table may also be a positive correlation. An integer x and a positive integer y are pre-stored in the storage module; the exponential value corresponding to minimum power-bit data is x and the power neuron data corresponding to any other one or more power-bit data is 0, where x denotes an offset value and y denotes a step length. In one embodiment, the exponential value corresponding to the minimum power-bit data is x, while the power neuron data corresponding to maximum power-bit data is 0, and the exponential values corresponding to other power-bit data than the minimum and the maximum power-bit data are (power-bit data+x)*y. By presetting different x and y as well as by changing the values of x and y, a range of representation by the power may become configurable and is suitable for different application contexts requiring varied numerical ranges. Therefore, the neural network computation device may be applied in a wider range. The application of the neural network computation device may be flexible and changeable, and may be adjusted according to user requirements.

In one embodiment, y is 1, x equals $-2^{m-1}$, so the exponential range of the value represented by power neuron data is $-2^{m-1}$ to $2^{m-1}-1$.

In one embodiment, a part of an encoding table with m being 5, x being 0 and y being 1 is shown in FIG. 1J, when the power-bit data is 00000, the corresponding exponential value is 0; when the power-bit data is 00001, the corresponding exponential value is 1; when the power-bit data is 00010, the corresponding exponential value is 2; when the power-bit data is 00011, the corresponding exponential value is 3; and when the power-bit data is 11111, the corresponding power neuron data is 0. As another part of an encoding table as shown in FIG. 1K, in which m is 5, x is 0 and y is 2, when the power-bit data is 00000, the corresponding exponential value is 0; when the power-bit data is 00001, the corresponding exponential value is 2; when the power-bit data is 00010, the corresponding exponential value is 4; when the power-bit data is 00011, the corresponding exponential value is 6; when the power-bit data is 11111, the corresponding power neuron data is 0.

A correspondence in the encoding table may be a negative correlation. An integer x and a positive integer y are pre-stored in the storage module; the exponential value corresponding to maximum power-bit data is x and the power neuron data corresponding to any other one or more power-bit data is 0, where x denotes an offset value and y denotes a step length. In one embodiment, the exponential value corresponding to the maximum power-bit data is x, while the power neuron data corresponding to minimum power-bit data is 0, and the exponential values corresponding to the other power-bit data than the minimum and the maximum power-bit data are (power-bit data−x)*y. By presetting different x and y as well as by changing the values of x and y, a range of representation by the power may become configurable and be suitable for different application contexts requiring varied numerical ranges. Therefore, the neural network computation device may be applied in a wider range. The application of the neural network computation device may be flexible and changeable, and may be adjusted according to user requirements.

In one embodiment, y is 1, x equals to $2^{m-1}$, so the exponential range of the value represented by power neuron data is $-2^{m-1}-1$ to $2^{m-1}$.

Figures 1K, 1L, 1M:
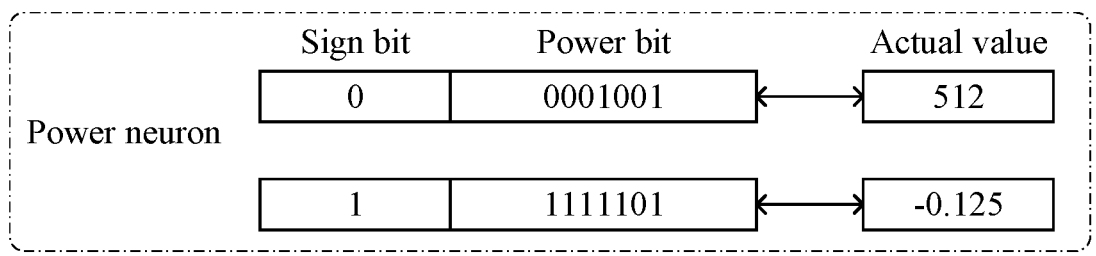
FIG. 1K is another diagram for an encoding table according to an embodiment of the present disclosure.
FIG. 1L is another diagram for an encoding table according to an embodiment of the present disclosure.
FIG. 1M is a diagram for a representation of power data according to an embodiment of the present disclosure.

As part of an encoding table as shown in FIG. 1L in which m is 5, when the power-bit data is 11111, the corresponding exponential value is 0; when the power-bit data is 11110, the corresponding exponential value is 1; when the power-bit data is 11101, the corresponding exponential value is 2; when the power-bit data is 11100, the corresponding exponential value is 3; when the power-bit data is 00000, the corresponding power neuron data is 0.

A correspondence in the encoding table may be that a most significant bit of the power-bit data represents a zero setting bit, and the other m−1 bits of the power-bit data correspond to exponential values. When the most significant bit of the power-bit data is 0, the corresponding power neuron data is 0; when the most significant bit of the power-bit data is 1, the corresponding power neuron data is not 0. Vice versa, which in other words, when the most significant bit of the power-bit data is 1, the corresponding power neuron data is 0; when the most significant bit of the power-bit data is 0, the corresponding power neuron data is not 0. In other words, one bit is separated from the power bit of the power neuron data to indicate whether the power neuron data is 0 or not.

In one specific example as shown in FIG. 1M, the sign bit has 1 bit, and the power-bit data has 7 bits, which in other words, m is 7. In the encoding table, when the power-bit data is 11111111, the corresponding power neuron data is 0, and when the power-bit data is of other values, the power neuron data corresponds to a respective binary complement. When the sign bit of a power neuron data is 0 and the power bit is 0001001, it represents a specific value of $2^9$, which in other words, it represents 512; when the sign bit of a power neuron data is 1 and its power bit is 1111101, it represents a specific value of $-2^{-3}$, which in other words, it represents −0.125. Compared with floating point data, the power data only retains the power bit of the data, which may significantly reduce the storage space required for data storage.

The power data representation may reduce the storage space required for storing neuron data. In examples of the embodiments, the power data have 8 bits. It should be recognized that a data length is not constant, and on different occasions, different data lengths may be adopted according to a range of the neuron data.

Step S1-2: subjecting the weight data and the neuron data to the neural network computation according to the computational microinstructions, where the Step S1-2 may include the following sub-steps:

S1-21: reading, by the decoding unit, computational instructions from the computational instruction buffer unit, and decoding the computational instructions into respective computational microinstructions;

S1-22: receiving, by the computation unit, the computational microinstructions, the power neuron data, and the weight data sent by the decoding unit, the input neuron buffer unit, and the weight buffer unit respectively, and executing the neural network computation on the weight data and the power neuron data according to the computational microinstructions.

The multiplication of a power neuron and a weight is specifically as follows: the sign bit of the power neuron data and the sign bit of the weight data are subjected to an XOR operation; in the case where a correspondence in the encoding table is scrambled, an exponential value corresponding to the power bits of the power neuron data may be found out by searching in the encoding table; in the case where the correspondence in the encoding table is a positive correlation, a minimum exponential value in the encoding table may be recorded and an addition computation may be performed to find out an exponential value corresponding to the power bit of the power neuron data; in the case where the correspondence in the encoding table is a negative correlation, a maximum value in the encoding table may be recorded and a subtraction computation may be performed to find out an exponential value corresponding to the power bit of the power neuron data; the exponential value and the power bit of the weight data may be added and the significant bits of the weight data may remain unchanged.

Figure 1N:
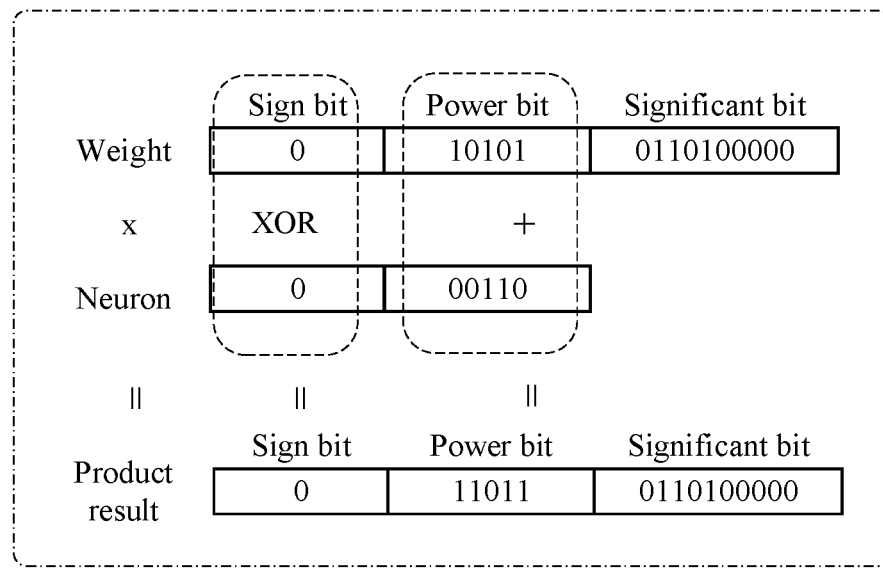
FIG. 1N is a diagram for a multiplication of a weight and a power neuron according to an embodiment of the present disclosure.

A specific example is shown in FIG. 1N. If the weight data is 16-bit floating point data, with the sign bit being 0, the power bit being 10101, and the significant bits being 0110100000, the actual value represented is $1.40625*2^6$. The sign bit of a power neuron data is 1-bit, and the power bit is 5-bit, which in other words, m is 5. In the encoding table, when the power-bit data is 11111, the corresponding power neuron data is 0, and when the power-bit data is of other values, the power data corresponds to a respective binary complement. When the power neuron is 000110, the actual value represented is 64, which is $2^6$. The power bit of the weight and the power bit of the power neuron are added to get 11011, and the actual value of the result is $1.40625*2^{12}$, which is the product result of the neuron and the weight. By this computation operation, the multiplication becomes an addition, which may reduce the amount of computation required for the calculations.

Figure 1O:
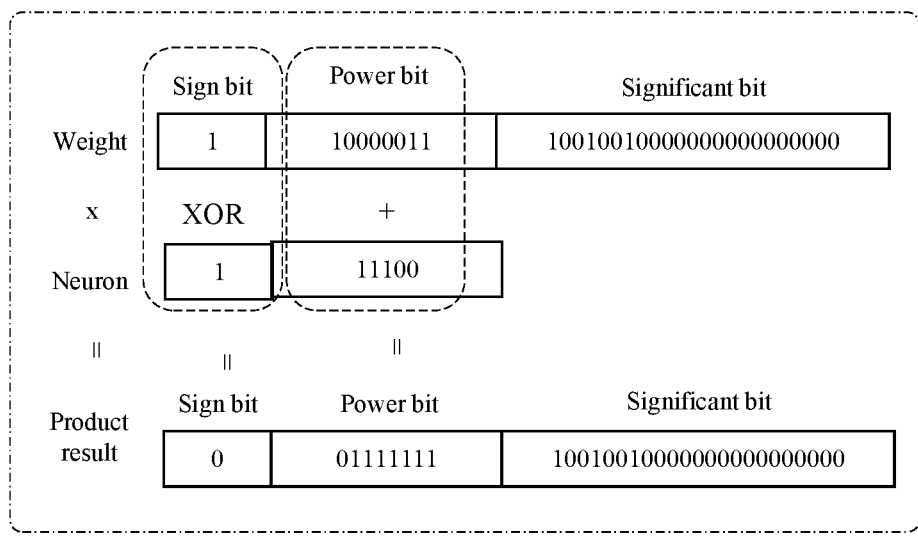
FIG. 1O is a diagram for a multiplication of a weight and a power neuron according to an embodiment of the present disclosure.

A specific example is shown in FIG. 1O. If the weight data is 32-bit floating point data, with the sign bit being 1, the power bit being 10000011, and the significant bits being 10010010000000000000000, the actual value represented is $-1.5703125*2^4$. The sign bit of the power neuron data is 1-bit, and the power-bits data is 5-bit, which in other words, m is 5. In the encoding table, when the power-bit data is 11111, the corresponding power neuron data is 0, and when the power-bit data is of other values, the power data corresponds to a respective binary complement. If the power neuron is 111100, the actual value represented is $-2^{-4}$. If adding the power bit of the weight with the power bit of the power neuron results in 01111111, the actual value of the result is $1.5703125*2^0$, which is the product result of the neuron and the weight.

Step S1-3: the first power conversion unit may convert the neuron data obtained after the neural network computation into power neuron data.

Where the Step S1-3 may include the following sub-steps:

S1-31: receiving, by the output neuron buffer unit, the neuron data sent by the computation unit after the neural network computation;

S1-32: receiving, by the first power conversion unit, the neuron data sent by the output neuron buffer unit, and converting non-power neuron data in the neuron data into power neuron data.

Various optional manners of power conversion exist, and may be selected according to actual application requirements. In this embodiment, three manners of power conversion are listed as follows:

A first power conversion manner:

$$s_{out} = s_{in}$$

$$d_{out+} = \lfloor \log_2(d_{in+}) \rfloor$$

where $d_{in}$ is the input data of the power conversion unit, $d_{out}$ is the output data of the power conversion unit, $s_{in}$ is the sign of the input data, $s_{out}$ is the sign of the output data, $d_{in+}$ is a positive part of the input data with $d_{in+} = d_{in} \times s_{in}$, $d_{out+}$ is a positive part of the output data with $d_{out+} = d_{out} \times s_{out}$, $\lfloor x \rfloor$ represents a flooring operation on the data x.

A second power conversion manner:

$$s_{out} = s_{in}$$

$$d_{out+} = \lceil \log_2(d_{in+}) \rceil$$

where $d_{in}$ is the input data of the power conversion unit, $d_{out}$ is the output data of the power conversion unit, $s_{in}$ is the sign of the input data, $s_{out}$ is the sign of the output data, $d_{in+}$ is a positive part of the input data with $d_{in+} = d_{in} \times s_{in}$, $d_{out+}$ is a positive part of the output data with $d_{out+} = d_{out} \times s_{out}$, $\lceil x \rceil$ represents a ceiling operation on the data x.

A third power conversion manner:

$$s_{out} = s_{in}$$

$$d_{out+} = [\log_2(d_{in+})]$$

where $d_{in}$ is the input data of the power conversion unit, $d_{out}$ is the output data of the power conversion unit, $s_{in}$ is the sign of the input data, $s_{out}$ is the sign of the output data, $d_{in+}$ is a positive part of the input data with $d_{in+} = d_{in} \times s_{in}$, $d_{out+}$ is a positive part of the output data with $d_{out+} = d_{out} \times s_{out}$, $[x]$ represents a rounding operation on the data x.

Additionally, the power neuron data obtained by the power conversion unit can serve as the input power neurons for a next layer of the neural network computation, and Steps 1 to 3 may be repeated until the computation of a last layer of the neural network is finished. By changing the integer x and the positive integer y pre-stored in the storage module, a range of power neuron data that can be representable by the neural network computation device may be adjusted.

In another embodiment, the present disclosure further provides a method of using the neural network computation device, where the range of power neuron data that can be representable by the neural network computation device may be adjusted by changing the integer x and the positive integer y pre-stored in the storage module.

In other embodiments of the present disclosure, being different from the preceding embodiments, the power conversion module of the computation device may be connected to the computation module for converting the input data and/or the output data of the neural network computation into the power data.

To be specific, the input data may include input neuron data and input weight data; the output data may include output neuron data and output weight data; and the power data may include power neuron data and power weight data.

In other words, on the basis of the aforementioned embodiments, in addition to the power conversion on the neuron data, the power conversion module here can further perform power conversion on the weight data. Besides, after being converted into power weight data, the weight data in the computation results can be directly sent to the data control unit for the subsequent computations. The remaining modules, units, functions and applications, computation as well as the connection relationships of the computation device are similar to those in the preceding embodiments.

Figure 2A:
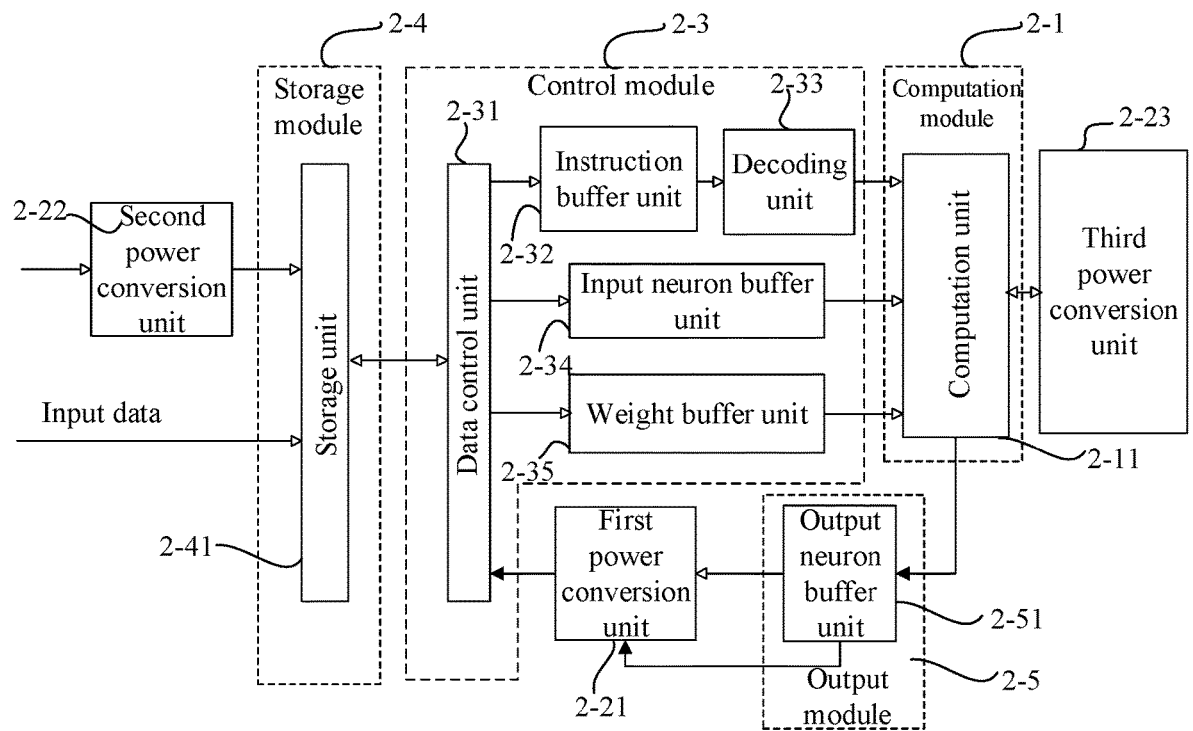
FIG. 2A is a structural diagram for a neural network computation device according to an embodiment of the present disclosure.

As shown in FIG. 2A, the neural network computation device of this embodiment may include a storage module 2-4, a control module 2-3, a computation module 2-1, an output module 2-5, and a power conversion module 2-2.

The storage module may include a storage unit 2-41 for storing data and instructions;

the control module may include:

a data control unit 2-31 connected to the storage unit, for the interactions of the data and the instructions between the storage unit and the buffer units;

an instruction buffer unit 2-32 connected to the data control unit for receiving instructions sent by the data control unit;

a decoding unit 2-33 connected to the instruction buffer unit for reading instructions from the instruction buffer unit and decoding the instructions into computational instructions;

an input neuron buffer unit 2-34 connected to the data control unit for receiving neuron data sent from the data control unit;

a weight buffer unit 2-35 connected to the data control unit for receiving weight data sent from the data control unit.

The computation module may include: a computation unit 2-11 connected to the control module for receiving data and computational instructions sent by the control module, and executing a neural network computation on the received neuron data and weight data according to the computational instructions;

the output module may include: an output neuron buffer unit 2-51 connected to the computation unit for receiving neuron data output by the computation unit; and sending the neuron data to the data control unit, as input data of a next layer of the neural network computation;

the power conversion module may include:

a first power conversion unit 2-21 connected to the output neuron buffer unit and the computation unit for converting the neuron data output from the output neuron buffer unit into the power neuron data and converting the weight data output from the computation unit into the power weight data; and/or a second power conversion unit 2-22 connected to the storage module, for converting the neuron data and the weight data input to the storage module into the power neuron data and the power weight data, respectively;

optionally, the computation device may further include: a third power conversion unit 2-23 connected to the computation unit, for converting the power neuron data and the power weight data into non-power neuron data and non-power weight data, respectively.

It should be noted that explanation is made here only by an example in which the power conversion module may include the first power conversion unit, the second power conversion unit, and the third power conversion unit at the same time, but in fact, the power conversion module may include any of the first power conversion unit, the second power conversion unit, and the third power conversion unit, like the embodiments shown in the FIGS. 1B, 1F and 1G.

The non-power neuron data and the non-power weight data may be converted into the power neuron data and the power weight data via the second power conversion unit and may then be input to the computation unit for computation; and during the computation, to increase precision, the third power conversion unit may be disposed for converting the power neuron data and the power weight data into the non-power neuron data and the non-power weight data, where the third power conversion unit may be disposed outside the computation module or inside the computation module; the output non-power neuron data after the computation may be converted into the power neuron data through the first power conversion unit and then fed back to the data control unit for subsequent computations, so as to increase the computation speed. A closed cycle may then be formed.

Furthermore, the specific operations of the power conversion on the weight data are the same as that in the preceding embodiments, and will not be repeated here.

Figure 2B:
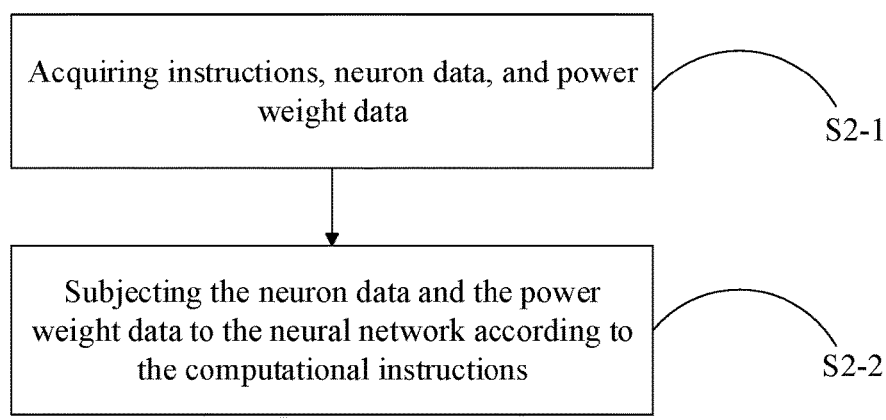
FIG. 2B is a flow chart of a neural network computation method according to an embodiment of the present disclosure.

In some embodiments, the neural network may be a multi-layer neural networks; for each layer of the neural network, a computation may be performed according to the computation method as shown in FIG. 2B, where the input power weight data for a first layer of the neural network may be read from an external address via the storage unit; if the weight data read from the external address is power weight data already, the weight data may be directly transmitted into the storage unit; if the weight data is not power weight data, the weight data may have to be converted into power weight data by the power conversion unit first. A mono-layer neural network computation method according to an embodiment is shown in FIG. 2B, including:

Step S2-1: acquiring instructions, neuron data and power weight data.

The Step S2-1 may include the following sub-steps:

S2-11: inputting the instructions, the neuron data, and the weight data to the storage unit, where the power weight data may directly be input to the storage unit, and the non-power weight data may be converted by the power conversion unit and then input to the storage unit;

S2-12: receiving, by the data control unit, the instructions, the neuron data, and the power weight data sent by the storage unit;

S2-13: receiving, by the instruction buffer unit, the input neuron buffer unit and the weight buffer unit respectively, the instructions, the neuron data, and the power weight data sent by the data control unit and distribute them to the decoding unit or the computation unit.

The power weight data indicates that values of weight data are represented by power exponential values of the values of weight data. Specifically, the power weight data may include a sign bit and a power bit; the sign bit represents a sign of the weight data with one or more bits, and power bit represents power-bit data of the weight data with m bits, in which m is a positive integer greater than 1. An encoding table may be pre-stored in the storage unit to provide an exponential value corresponding to each power-bit data of the power neuron data. The encoding table may provide one or more power-bit data (in other words, zero setting power-bit data) to make an assigned corresponding power weight data 0. In other words, when the power-bit data of the power weight data is a zero setting power-bit data in the encoding table, the power weight data is 0. A correspondence in the encoding table is similar to that in the aforementioned embodiments, and will not be repeated here.

Figure 2C:
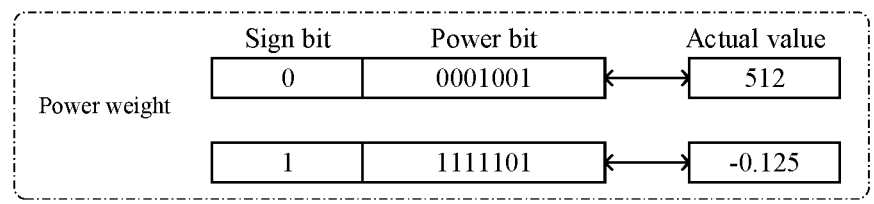
FIG. 2C is a diagram for a representation of power data according to an embodiment of the present disclosure.

In one specific example as shown in FIG. 2C, the sign bit has 1 bit, and the power-bit data has 7 bits, which in other words, m is 7. In the encoding table, when the power-bit data is 11111111, the corresponding power weight data is 0, and when the power-bit data is of other values, the power weight data corresponds to a respective binary complement. When the sign bit of a power weight data is 0 and its power bit is 0001001, it represents a specific value of $2^9$, which in other words, it represents 512; when the sign bit of the power weight data is 1 and its power bit is 1111101, it represents a specific value of $-2^{-3}$, which in other words, it represents −0.125. Compared with floating point data, the power data only retains the power bit of the data, which significantly reduces the storage space required for data storage.

The power data representation can reduce the storage space required for storing the weight data. In examples of the embodiment, the power data have 8 bits. It should be recognized that a data length is not constant, and on different occasions different data lengths may be adopted according to a range of the weight data.

Step S2-2: subjecting the neuron data and the power weight data to the neural network computation according to the computational instructions, where the Step S2-2 may include the following sub-steps:

S2-21: reading, by the decoding unit, instructions from an instruction buffer unit, and decoding the instructions into respective computational instructions;

S2-22: receiving, by the computation unit, the computational instructions, the power weight data, and the neuron data sent by the decoding unit, the input neuron buffer unit, and the weight buffer unit respectively, and executing the neural network computation on the neuron data and the power weight data according to the computational instructions.

The multiplication of a neuron and a power weight is specifically as follows: the sign bit of the neuron data and the sign bit of the power weight data may be subjected to an XOR operation; in the case where a correspondence in the encoding table is scrambled, an exponential value corresponding to the power bit of the power weight data may be found out by searching in the encoding table; in the case where the correspondence in the encoding table is a positive correlation, a minimum exponential value in the encoding table may be recorded and an addition computation may be performed to find out an exponential value corresponding to the power bit of the power weight data; in the case where a correspondence in the encoding table is a negative correlation, a maximum value in the encoding table may be recorded and a subtraction computation may be performed to find out an exponential value corresponding to the power bit of the power weight data; the exponential value and the power bit of the neuron data may be added and the significant bits of the neuron data may remain unchanged.

Figure 2D:
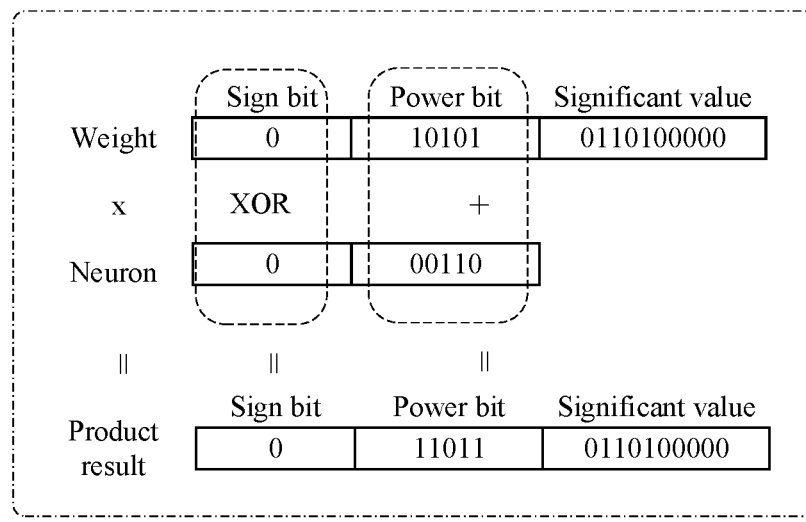
FIG. 2D is a diagram for a multiplication of a weight and a power neuron according to an embodiment of the present disclosure.

A specific example is shown in FIG. 2D. If the neuron data is 16-bit floating point data, in which the sign bit is 0, the power bit is 10101, and the significant bits are 0110100000, the actual value represented is $1.40625*2^6$. The sign bit of a power weight data is 1-bit, and the power bit is 5-bit, which in other words, m is 5. In the encoding table, when the power-bit data is 11111, the corresponding power weight data is 0, and when the power-bit data is of other values, the power data corresponds to a respective binary complement. When the power weight is 000110, the actual value represented is 64, which is $2^6$. The power bit of the power weight and the power bit of the neuron are added to get 11011, and the actual value of the result is $1.40625*2^{12}$, which is the product result of the neuron and the power weight. By this computation, the multiplication becomes an addition, which reduces the amount of computation required for the calculations.

Figure 2E:
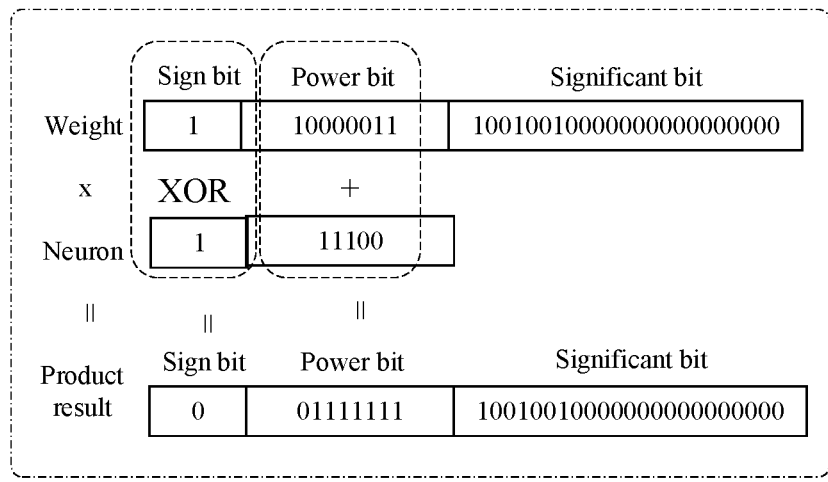
FIG. 2E is a diagram for a multiplication of a weight and a power neuron according to an embodiment of the present disclosure.

A specific example is shown in FIG. 2E. If the neuron data is 32-bit floating point data, in which the sign bit is 1, the power bit is 10000011, and the significant bits are 10010010000000000000000, the actual value represented is $-1.5703125*2^4$. The sign bit of the power weight data is 1-bit, and the power-bits data is 5-bit, that is, m is 5. In the encoding table, when the power-bit data is 11111, the corresponding power weight data is 0, and when the power-bit data is of other values, the power data corresponds to a respective binary complement. If the power neuron is 111100, the actual value represented is $-2^{-4}$. If adding the power bit of the neuron with the power bit of the power weight results in 01111111, the actual value of the result is $1.5703125*2^0$, which is the product result of the neuron and the power weight.

Optionally, the method may further include Step S2-3: outputting the neuron data obtained after the neural network computation as the input data of a next layer of the neural network computation.

Step S2-3 may include the following sub-steps:

S2-31: receiving, by the output neuron buffer unit, the neuron data sent by the computation unit after the neural network computation;

S2-32: transferring the neuron data received by the output neuron buffer unit to the data control unit; the neuron data obtained by the output neuron buffer unit can serve as the input neurons of the next layer of the neural network computation, and Steps S2-1 to S2-3 may be repeated until the computation of a last layer of the neural network is finished.

In addition, the power neuron data obtained by the power conversion unit can serve as the input power neurons for the next layer of the neural network computation, and Steps S2-1 to S2-3 may be repeated until the computation of the last layer of the neural network is finished. A range of the power neuron data representable by the neural network computation device may be adjusted by changing the integer x and the positive integer y pre-stored in the storage module.

Figure 2F:
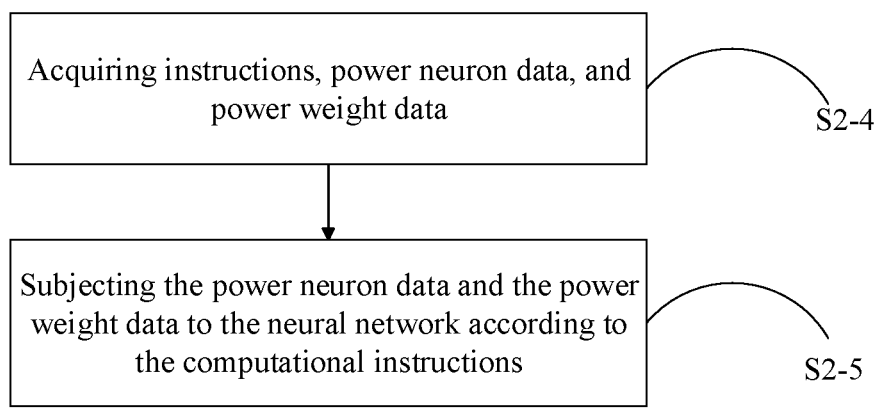
FIG. 2F is a flow chart of a neural network computation method according to an embodiment of the present disclosure.

In some embodiments, the neural network may be a multi-layer neural network. For each layer of the neural network, a computation can be performed according to the computation method as shown in FIG. 2F, where the input power weight data for a first layer of the neural network may be read from an external address via the storage unit; if the data read from the external address is power weight data already, the data may be directly transmitted into the storage unit; if the data is not power weight data, the data may have to be converted into power weight data by the power conversion unit. The input power neuron data for the first layer of the neuron network can be read from an external address by the storage unit, if the data read from the external address is power data already, it can be directly transmitted into the storage unit; or otherwise, the data has to be converted into power neuron data by the power conversion unit. The input neuron data of each subsequent layer of the neuron network may be provided by the output power neuron data of one or more layers of the neural network prior to this layer. A mono-layer neural network computation method according to an embodiment is shown in FIG. 2F, including:

Step S2-4: acquiring the instructions, the power neuron data, and the power weight data.

The Step S2-4 may include the following sub-steps:

S2-41: inputting the instructions, the neuron data, and the weight data to the storage unit, where the power neuron data and the power weight data may be directly input to the storage unit, and the non-power neuron data and the non-power weight data may be converted by the first power conversion unit into the power neuron data and the power weight data, and then input to the storage unit;

S2-42: receiving, by the data control unit, the instructions, the power neuron data, and the power weight data sent by the storage unit;

S2-43: receiving, by an instruction buffer unit, an input neuron buffer unit, and a weight buffer unit respectively, the instructions, the power neuron data, and the power weight data sent by the data control unit and distributing them to the decoding unit or the computation unit.

The power neuron data and the power weight data indicate that values of neuron data and weight data are represented by power exponential values of the values of neuron data and weight data. Specifically, both the power neuron data and the power weight data may include sign bits and power bits; the sign bits represent signs of the neuron data and the weight data with one or more bits, and the power bits represent power-bit data of the neuron data and the weight data with m bits, in which m is a positive integer greater than 1. An encoding table may be pre-stored in the storage unit of the storage module to provide an exponential value corresponding to each power-bit data of the neuron data and the weight data. The encoding table may provide one or more power-bit data (in other words, zero setting power-bit data) to make an assigned corresponding power neuron data and an assigned corresponding power weight data 0. In other words, when the power-bit data of the power neuron data and the power weight data are zero setting power-bit data in the encoding table, the power neuron data and the power weight data are 0.

Figure 2G:
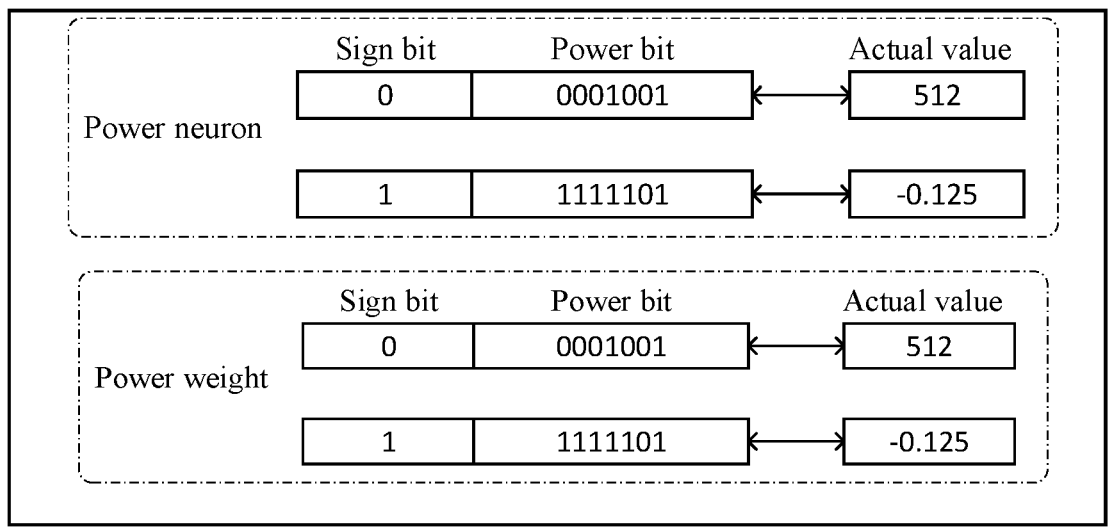
FIG. 2G is a diagram for a representation of power data according to an embodiment of the present disclosure.

In a specific embodiment, as shown in FIG. 2G, the sign bit has 1 bit, and the power-bit data have 7 bits, which in other words, m is 7. In the encoding table, when the power-bit data is 11111111, the corresponding power neuron data and power weight data are 0, and when the power-bit data is of other values, the power neuron data and the power weight data correspond to respective binary complements. When the sign bit of the power neuron data and the power weight data are 0 and the power bit is 0001001, it represents a specific value of $2^9$, which in other words, it represents 512; when the sign bit of the power neuron data and the power weight data is 1 and its power bit is 1111101, it represents a specific value of $-2^{-3}$, which in other words, it represents −0.125. Compared with floating point data, the power data only retains the power bit of the data, which may significantly reduce the storage space required for data storage.

The power data representation can reduce the storage space required for storing neuron data and weight data. In examples of the embodiments, the power data have 8 bits. It should be recognized that a data length is not constant, but on different occasions, different data lengths may be adopted according to a range of the neuron data and the weight data.

Step S2-5: subjecting the power neuron data and the power weight data to the neural network computation according to the computational instructions, where the Step S2-5 may include the following sub-steps:

S2-51: reading, by the decoding unit, instructions from the instruction buffer unit, and decoding the instructions into respective computational instructions;

S2-52: receiving, by the computation unit, the computational instructions, the power neuron data, and the power weight data sent by the decoding unit, the input neuron buffer unit, and the weight buffer unit respectively, and executing the neural network computation on the power neuron data and the power weight data according to the computational instructions.

The multiplication of a power neuron and a power weight is specifically as follows: the sign bit of the power neuron data and the sign bit of the power weight data may be subjected to an XOR operation; in the case where a correspondence in the encoding table is scrambled, exponential values corresponding to the power bit of the power neuron data and that of the power weight data may be found out by searching in the encoding table; in the case where a correspondence in the encoding table is a positive correlation, a minimum exponential value in the encoding table may be recorded and an addition may be performed to find out exponential values corresponding to the power bit of the power neuron data and that of the power weight data; in the case where a correspondence in the encoding table is a negative correlation, a maximum value in the encoding table may be recorded and a subtraction computation may be performed to find out exponential values corresponding to the power bit of the power neuron data and that of the power weight data; the exponential value corresponding to the power neuron data and that corresponding to the power weight data may be added.

Figure 2H:
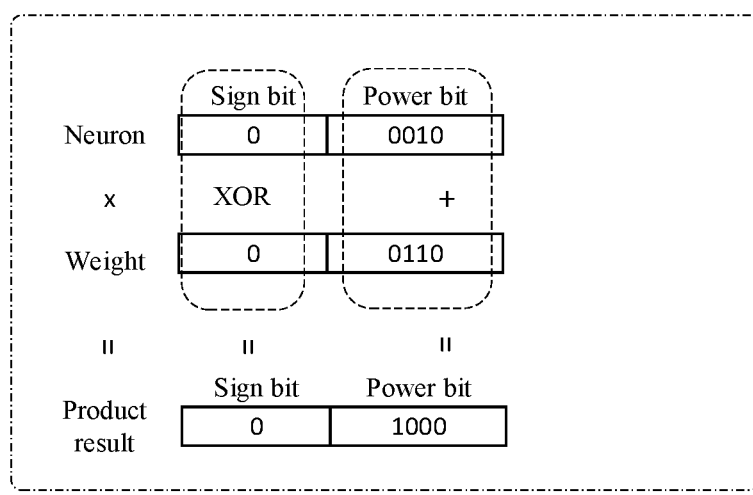
FIG. 2H is a diagram for a multiplication of a power neuron and a power weight according to an embodiment of the present disclosure.

A specific example IV is shown in FIG. 2H. Sign bits of the power neuron data and the power weight data have 1 bit, and the power-bit data have 4 bits, which in other words, m is 4. In the encoding table, when the power-bit data is 1111, the corresponding power weight data is 0; and when the power-bit data is of other values, the power data correspond to respective binary complements. If the power neuron data is 00010, the actual value represented is $2^2$. If the power weight data is 00110, the actual value represented is 64, which in other words, the actual value represented is $2^6$. If the product of the power neuron data and the power weight data is 01000, the actual value represented is $2^8$.

It can be seen that the multiplication of the power neuron data and the power weight data may be simpler than the multiplication of floating-point data as well as the multiplication of floating-point data and power data.

The method according to this embodiment may further include Step S2-6: outputting the neuron data obtained after the neural network computation as the input data of a next layer of the neural network computation.

The Step S2-6 may include the following sub-steps:

S2-61: receiving, by the output neuron buffer unit, the neuron data sent by the computation unit after the neural network computation.

S2-62: transferring the neuron data received by the output neuron buffer unit to the data control unit; the neuron data obtained by the output neuron buffer unit can serve as the input neurons of the next layer of the neural network computation, and Steps S2-4 to S2-6 may be repeated until the computation of a last layer of the neural network is finished.

Since the neuron data obtained after the neural network computation may also be power data, the bandwidth required for transmitting them to the data control unit may be significantly reduced in comparison with that required by floating-point data, the overhead on neural network storage resources and computing resources may further be reduced, and the computation speed of neural networks be improved.

In addition, the specific operations of the power conversion are the same as that in the preceding embodiments, and will not be repeated here.

All the units in the disclosed embodiments can be hardware structures, and the physical implementation of the hardware structures may include, but is not limited to physical devices, which may include but is not limited to transistors, memristors and DNA computers.

Heretofore, the embodiments of the present disclosure have been described in detail in conjunction with the drawings. Based on the above description, those skilled in the art should have a clear understanding of the neural network computation device and method of the present disclosure.

In some embodiments, the present disclosure provides a chip including the above computation device.

In some embodiments, the present disclosure further provides a chip package structure including the above chip.

In some embodiments, the present disclosure further provides a board including the above chip package structure.

In some embodiments, the present disclosure further provides electronic device including the above board.

The electronic device may include a data processing device, a robot, a computer, a printer, a scanner, a tablet, a smart terminal, a mobile phone, a driving recorder, a navigator, a sensor, a camera, a server, a cloud server, a camera, a video camera, a projector, a watch, an earphone, a mobile storage, a wearable device, a transportation, a household appliance, and/or a medical facility.

The transportation includes an airplane, a ship and/or a vehicle. The household appliance includes a television set, an air conditioner, a microwave oven, a refrigerator, a rice cooker, a humidifier, a washing machine, an electric lamp, a gas stove, and a range hood. The medical device includes a nuclear magnetic resonance instrument, a B-ultrasound machine, and/or an electrocardiograph.

It should be noted that, for the sake of brevity, the foregoing method embodiments are all described as a combination of a series of actions, but those skilled in the art should understand that the present disclosure is not limited by the described sequence of actions, because certain steps may be performed in other sequences or concurrently in accordance with the present disclosure. Furthermore, those skilled in the art should also understand that the embodiments described in the specification are all optional embodiments, and the actions and modules involved are not necessarily required by the present disclosure.

The above various embodiments are described with different focuses, and the parts that are not detailed in a certain embodiment can be found in the related descriptions of other embodiments.

In the several embodiments provided herein, it should be understood that the disclosed device may be implemented in other ways. For example, the device embodiments described above are merely illustrative. For example, the division of the units is only a logical functional division. In actual implementations, there may be other dividing manners, for example, combining a plurality of units or components or integrating them into another system, or ignoring or not executing some features. In addition, the mutual coupling or direct coupling or communication connection shown or discussed may be indirect coupling or communication connection through some interfaces, devices or units, and may be in an electrical form or other forms.

The units described as separate components may or may not be physically separated, and the components presented as units may or may not be physical units; that is, they may be located in one place, or may be distributed to multiple network units. Some or all of the units may be selected according to actual needs to achieve the purpose of the technical solution of the embodiment.

In addition, the respective functional units in the respective embodiments of the present disclosure may be integrated into one processing unit, or each unit may exist in a physically independent manner, or two or more units may be integrated in one unit. The above integrated unit can be implemented in the form of hardware or in the form of a software program module.

The integrated unit, if implemented in the form of a functional software unit and sold or used as a standalone product, may be stored in a computer readable memory. Based on such understanding, the essence of the technical solution of the present disclosure or the part of the technical solution which makes a contribution to the prior art or the whole or part of the technical solution may be embodied in the form of a software product. The computer software product is stored in a memory which includes a number of instructions for causing a computer device (which may be a personal computer, server or network device, etc.) to perform all or some of the steps of the method described in each embodiment of the present disclosure. The foregoing memory includes various media that can store program codes, such as USB stick, Read-Only Memory (ROM), Random Access Memory (RAM), removable hard disk, magnetic disk, CD, and the likes.

Those skilled in the art may understand that all or some of the steps in the methods of the above embodiments can be completed with related hardware instructed by a program. The program can be stored in a computer readable memory. The memory may include: flash disk, Read-Only Memory (ROM), Random Access Memory (RAM), magnetic disk, CD, and the likes.

The above description of the disclosed embodiments enables those skilled in the art to implement or use the present disclosure. Various modifications to these embodiments are obvious to those skilled in the art, and the general principles defined herein may be implemented in other embodiments without departing from the spirit or scope of the present disclosure. Therefore, the present disclosure is not limited to the embodiments shown herein, but satisfies the broadest scope consistent with the principles and novel features disclosed herein.

It should be noted that the implementations that are not shown or described in the drawings or the description are all known to those skilled in the art, and are not described in detail. In addition, the above definitions of the various elements and methods are not limited to the specific structures, shapes or manners mentioned in the embodiments, and modifications and alternation can be readily conceived by those skilled in the art. For example:

The control module of the present disclosure is not limited to a specific composition and structure in the embodiments, the control modules that can achieve interactions of data and computational instructions between the storage module and the computation unit and are generally known to those skilled in the art can all be used in the present disclosure.

The foregoing embodiments further explain the objective, the technical solution, and the advantageous effects of the present disclosure. It is appreciated that the foregoing is merely specific embodiments of the present disclosure, and is not intended to be limiting. Any modification, equivalent substitution, improvements, etc. made within the spirit and principles of the present disclosure shall be included in the scope of the present disclosure.

What is claimed is:

1. A neural network computation device, comprising:
   a computation circuit configured to execute a neural network computation;
   a power conversion circuit connected to the computation circuit, wherein the power conversion circuit is configured to convert input data and/or output data of the neural network computation into power data,
      wherein the power data includes power neuron data and power weight data,
      wherein the power weight data includes a sign bit that indicates a sign of the power weight data and a power bit that indicates power-bit data of the power weight data, and
      wherein the power neuron data includes a sign bit that indicates a sign of the power neuron data and a power bit that indicates power-bit data of the power neuron data; and
   a storage circuit configured to store a pre-stored encoding table,
      wherein the encoding table includes the power-bit data and exponential values, and
      wherein the encoding table is used to acquire a corresponding exponential value of each power-bit data according to the power-bit data of the power neuron data and the power weight data,
      wherein the computation circuit is further configured to:
         perform an XOR operation between the sign bit of the power weight data and the sign bit of the power neuron data, and
         add the exponential value corresponding to the power-bit data of the power weight data and the exponential value corresponding to the power-bit of the power neuron data.

2. The neural network computation device of claim 1, wherein the input data includes input neuron data and input weight data, and
   wherein the output data includes output neuron data and output weight data.

3. The neural network computation device of claim 2, wherein the power conversion circuit includes:
   a first power conversion circuit configured to convert the output data of the computation circuit into the power data, and
   a second power conversion circuit configured to convert the input data of the computation circuit into the power data.

4. The neural network computation device of claim 3, wherein the computation circuit further includes a third power conversion circuit configured to convert the power data into non-power data.

5. The neural network computation device of claim 4, wherein the neural network computation device further includes:
   a storage circuit configured to store data and computational instructions, a control circuit configured to:
control interactions of the data and the computational instructions,
receive the data and the computational instructions sent by the storage circuit and
decode the computational instructions into computational microinstructions, wherein the computation circuit includes a unit circuit configured to receive the data and the computational microinstructions sent by the control circuit, and perform the neural network computation on the received weight data and neuron data according to the computational microinstructions.

6. The neural network computation device of claim 5,
wherein the control circuit includes an instruction buffer circuit, a decoding circuit, an input neuron buffer circuit, a weight buffer circuit, and a data control circuit,
wherein the instruction buffer circuit is connected to the data control circuit and configured to receive computational instructions sent by the data control circuit,
wherein the decoding circuit is connected to the instruction buffer circuit and configured to read computational instructions from the instruction buffer circuit and decode the computational instructions into computational microinstructions,
wherein the input neuron buffer circuit is connected to the data control circuit and configured to acquire corresponding power neuron data from the data control circuit,
wherein the weight buffer circuit is connected to the data control circuit and configured to acquire corresponding power weight data from the data control circuit,
wherein the data control circuit is connected to the storage circuit and configured to implement interactions of the data and the computational instructions between the storage circuit and the computational instruction buffer circuit, the weight buffer circuit as well as the input neuron buffer circuit, respectively,
wherein the computation circuit is connected to the decoding circuit, the input neuron buffer circuit and the weight buffer circuit respectively, and configured to receive the computational microinstructions, the power neuron data and the power weight data, and perform corresponding neural network computations on the power neuron data and the power weight data received by the computation circuit according to the computational microinstructions.

7. The neural network computation device of claim 6,
wherein the neural network computation device further includes an output circuit, the output circuit includes an output neuron buffer circuit for receiving neuron data output from the computation circuit,
wherein the power conversion circuit includes:
a first power conversion circuit connected to the output neuron buffer circuit and the computation circuit and configured to convert the neuron data output from the output neuron buffer circuit into the power neuron data and convert the weight data output from the computation circuit into the power weight data, and
a second power conversion circuit connected to the storage circuit and configured to convert the neuron data and the weight data input to the storage circuit into the power neuron data and the power weight data, respectively,
wherein the computation circuit further includes a third power conversion circuit connected to the computation circuit and configured to convert the power neuron data and the power weight data into non-power neuron data and non-power weight data, respectively.

8. The neural network computation device of claim 7,
wherein the first power conversion circuit is further connected to the data control circuit and configured to convert the neuron data and the weight data output from the computation circuit into the power neuron data and the power weight data respectively, and send the power neuron data and the power weight data to the data control circuit as input data of a next layer of neural network computation.

9. The neural network computation device of claim 8,
wherein the sign bit includes one or more bits of data and the power bit includes m bits of data, in which m is a positive integer greater than 1,
wherein the power weight data indicates that a value of the weight data is represented in the manner of its power exponent, wherein the power weight data includes a sign bit and a power bit,
wherein the sign bit uses one or more bits to represent the sign of the weight data, and
wherein the power bit uses m bits to represent the power-bit data of the weight data, in which m is a positive integer greater than 1.

10. The neural network computation device of claim 9,
wherein the encoding table further includes one or more zero setting power-bit data, and
wherein corresponding power neuron data and power weight data of the zero setting power-bit data are 0.

11. The neural network computation device of claim 10,
wherein the power neuron data and the power weight data corresponding to maximum power-bit data are 0, or the power neuron data and the power weight data corresponding to minimum power-bit data are 0.

12. The neural network computation device of claim 11,
wherein a correspondence in the encoding table is that a most significant bit of the power-bit data represents a zero setting bit, while the other m-1 bits of the power-bit data correspond to the exponential values.

13. The neural network computation device of claim 12,
wherein a correspondence in the encoding table is a positive correlation, an integer x and a positive integer y are pre-stored in the storage circuit, and
wherein the exponential value corresponding to the minimum power-bit data is x, where x denotes an offset value and y denotes a step length.

14. The neural network computation device of claim 13,
wherein the exponential value corresponding to the minimum power-bit data is x, the power neuron data and the power weight data corresponding to the maximum power-bit data are 0, and wherein the exponential values corresponding to other power-bit data than the minimum and the maximum power-bit data are (power-bit data+x) *y.

15. The neural network computation device of claim 14, wherein y=1, $x=-2^{m-1}$.

16. The neural network computation device of claim 15,
wherein a correspondence in the encoding table is a negative correlation, an integer x and a positive integer y are pre-stored in the storage circuit, and wherein the exponential value corresponding to the maximum power-bit data is x, where x denotes an offset value and y denotes a step length.

17. The neural network computation device of claim 16,
wherein the exponential value corresponding to the maximum power-bit data is x, the power neuron data and the power weight data corresponding to the minimum power-bit data are 0, and the exponential values corresponding to other power-bit data than the minimum and maximum power-bit data are (power-bit data-x) *y.

18. The neural network computation device of claim 17, wherein y=1, x=$2^{m-1}$.

19. The neural network computation device of claim 18, wherein converting the neuron data and the weight data respectively into the power neuron data and the power weight data includes:

$$s_{out}=s_{in}$$

$$d_{out+}=\lfloor \log_2(d_{in+}) \rfloor$$

where $d_{in}$ is the input data of the power conversion circuit, $d_{out}$ is the output data of the power conversion circuit, $s_{in}$ is the sign of the input data, $s_{out}$ is the sign of the output data, $d_{in+}$, is a positive part of the input data with $d_{in+}=d_{in} \times s_{in}$, $d_{out+}$, is a positive part of the output data with $d_{out+}=d_{out} \times s_{out}$, $\lfloor x \rfloor$ represents a flooring operation on the data x; or $$s_{out}=s_{in}$$

$$d_{out+}=\lceil \log_2(d_{in+}) \rceil$$

where $d_{in}$ is the input data of the power conversion circuit, $d_{out}$ is the output data of the power conversion circuit, $s_{in}$ is the sign of the input data, $s_{out}$ is the sign of the output data, $d_{in+}$, is a positive part of the input data with $d_{in+}=d_{in} \times s_{in}$, $d_{out+}$, is a positive part of the output data with $d_{out+}=d_{out} \times s_{out}$, $\lceil x \rceil$ represents a ceiling operation on the data x, or $$s_{out}=s_{in}$$

$$d_{out+}=[\log_2(d_{in+})]$$

where $d_{in}$ is the input data of the power conversion circuit, $d_{out}$ is the output data of the power conversion circuit, $s_{in}$ is the sign of the input data, $s_{out}$ is the sign of the output data, $d_{in+}$, is a positive part of the input data with $d_{in+}=d_{in} \times s_{in}$, $d_{out+}$, is a positive part of the output data with $d_{out+}=d_{out} \times s_{out}$, $[x]$ represents a rounding operation on the data x.

20. A neural network computation method, comprising:
executing a neural network computation,
converting input data of the neural network computation into power data prior to the execution of the neural network computation; and/or converting output data of the neural network computation into power data after the execution of the neural network computation,
   wherein the power data includes power neuron data and power weight data,
   wherein the power weight data includes a sign bit that indicates a sign of the power weight data and a power bit that indicates power-bit data of the power weight data, and
   wherein the power neuron data includes a sign bit that indicates a sign of the power neuron data and a power-bit that indicates power-bit data of the power neuron data, and
storing, by a storage circuit, a pre-stored encoding table,
   wherein the encoding table includes the power-bit data and exponential values, and
   wherein the encoding table is used to acquire a corresponding exponential value of each power-bit data according to the power-bit data of the power neuron data and the power weight data,
performing an XOR operation between the sign bit of the power weight data and the sign bit of the power neuron data, and
adding the exponential value corresponding to the power-bit data of the power weight data and the exponential value corresponding to the power-bit of the power neuron data.

21. The neural network computation method of claim 20, wherein, the input data includes input neuron data and input weight data,
   wherein the output data includes output neuron data and output weight data.

22. The neural network computation method of claim 21, wherein the converting input data of the neural network computation into power data prior to the execution of the neural network computation includes:
   converting non-power data in the input data into power data, and
   receiving and storing computational instructions and the power data.

23. The neural network computation method of claim 22, wherein between the receiving and storing computational instructions and the power data, and the executing the neural network computation, the method further includes:
   reading computational instructions, and decoding the computational instructions into respective computational microinstructions.

24. The neural network computation method of claim 23, wherein in the executing the neural network computation, the power weight data and the power neuron data are subjected to the neural network computation according to the computational microinstructions.

25. The neural network computation method of claim 24, wherein the converting output data of the neural network computation into power data after the execution of the neural network computation includes:
   outputting data obtained from the neural network computation; and
   converting non-power data in the data obtained from the neural network computation into power data.

26. The neural network computation method of claim 25, wherein the non-power data in the data obtained from the neural network computation is converted into power data which then is sent to the data control circuit, as input data of a next layer of the neural network computation, the neural network computation and the converting the non-power data into the power data are repeated until the computation of a last layer of the neural network is finished.

27. The neural network computation method of claim 26, wherein an integer x and a positive integer y are pre-stored in the storage circuit, where x denotes an offset value and y denotes a step length.

28. The neural network computation method of claim 27, wherein a range of the power data representable by the neural network computation device can be adjusted by changing the integer x and the positive integer y pre-stored in the storage circuit.

* * * * *